(12) United States Patent
Mori

(10) Patent No.: US 10,063,759 B2
(45) Date of Patent: Aug. 28, 2018

(54) IMAGE PICKUP APPARATUS, IMAGE CAPTURING SYSTEM, METHOD OF CONTROLLING IMAGE PICKUP APPARATUS, METHOD OF CONTROLLING IMAGE CAPTURING SYSTEM, AND PROGRAM

(71) Applicant: CANON KABUSHIKI KAISHA, Tokyo (JP)

(72) Inventor: Kazuhide Mori, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 15/030,180

(22) PCT Filed: Aug. 8, 2014

(86) PCT No.: PCT/JP2014/004148
§ 371 (c)(1),
(2) Date: Apr. 18, 2016

(87) PCT Pub. No.: WO2015/056379
PCT Pub. Date: Apr. 23, 2015

(65) Prior Publication Data
US 2016/0277652 A1    Sep. 22, 2016

(30) Foreign Application Priority Data
Oct. 18, 2013 (JP) .................. 2013-217291

(51) Int. Cl.
*H04N 5/232* (2006.01)
*G06T 7/70* (2017.01)
(Continued)

(52) U.S. Cl.
CPC .............. *H04N 5/232* (2013.01); *G06T 7/70* (2017.01); *H04L 12/10* (2013.01); *H04L 12/28* (2013.01); *H04N 7/18* (2013.01)

(58) Field of Classification Search
CPC .......... G06T 7/70; H04L 12/10; H04L 12/28; H04N 7/18; H04N 5/23293; H04N 1/2125; H04N 1/00408; G06F 3/0484
See application file for complete search history.

(56) References Cited

U.S. PATENT DOCUMENTS 5,559,554 A * 9/1996 Uekane .............. H04N 5/23293
348/333.02
7,030,912 B1 * 4/2006 Honma .................. H04N 5/225
348/222.1
(Continued)

FOREIGN PATENT DOCUMENTS

JP    H07-131684 A    5/1995
JP    2001-069494 A    3/2001
(Continued)

*Primary Examiner* — Nelson D. Hernández Hernández
(74) *Attorney, Agent, or Firm* — Canon U.S.A., Inc. IP Division

(57) ABSTRACT

An image pickup apparatus capable of communicating with an external apparatus includes an image capturing unit, a superimposing unit, and a control unit. The image capturing unit captures an image of a subject to generate a captured image. The superimposing unit superimposes first information and second information on the captured image supplied from the image capturing unit. The control unit rotates the captured image supplied from the image capturing unit in a state in which a position of the first information superimposed by the superimposing unit relative to a position of the subject is changed while a position of the second information superimposed by the superimposing unit relative to the position of the subject is kept unchanged.

11 Claims, 23 Drawing Sheets

(51) Int. Cl.
*H04L 12/10* (2006.01)
*H04L 12/28* (2006.01)
*H04N 7/18* (2006.01)

(56) References Cited

U.S. PATENT DOCUMENTS

2003/0052985 A1* 3/2003 Oya .................. H04N 5/23293
348/333.02
2012/0098965 A1* 4/2012 Barcala ............ G08B 13/19686
348/143

FOREIGN PATENT DOCUMENTS

| | | |
|---|---|---|
| JP | 2002-16789 A | 1/2002 |
| JP | 2004-304847 A | 10/2004 |
| JP | 2005-286468 A | 10/2005 |
| WO | 2013-072981 A1 | 5/2013 |

* cited by examiner

FIG. 7A

```
<xs:complexType name="OSDConfiguration">
    <xs:complexContent>
        <xs:extension base="tt:DeviceEntity">
            <xs:sequence>
                <xs:element name="VideoSourceConfigurationToken" type="tt:OSDReference"/>
                <xs:element name="Type" type="tt:OSDType"/>
                <xs:element name="Position" type="tt:OSDPosConfiguration"/>
                <xs:element name="TextString" type="tt:OSDTextConfiguration" minOccurs="0"/>
                <xs:element name="Image" type="tt:OSDImgConfiguration" minOccurs="0"/>
                <xs:element name="Extension" type="tt:OSDConfigurationExtension" minOccurs="0"/>
            </xs:sequence>
        </xs:extension>
    </xs:complexContent>
</xs:complexType>
```

FIG. 7B

```
<xs:complexType name="OSDReference">
    <xs:simpleContent>
        <xs:extension base="tt:ReferenceToken">
            <xs:anyAttribute processContents="lax"/>
        </xs:extension>
    </xs:simpleContent>
</xs:complexType>
```

FIG. 7C

```
<xs:simpleType name="OSDType">
    <xs:restriction base="xs:string">
        <xs:enumeration value="Text"/>
        <xs:enumeration value="Image"/>
        <xs:enumeration value="Extended"/>
    </xs:restriction>
</xs:simpleType>
```

FIG. 7D

```
<xs:complexType name="OSDPosConfiguration">
    <xs:sequence>
        <xs:element name="Type" type="xs:string"/>
        <xs:element name="Pos" type="tt:Vector" minOccurs="0"/>
    </xs:sequence>
</xs:complexType>
```

FIG. 7E

```xml
<xs:complexType name="OSDTextConfiguration">
    <xs:sequence>
        <xs:element name="Type" type="xs:string"/>
        <xs:element name="DateFormat" type="xs:string" minOccurs="0"/>
        <xs:element name="TimeFormat" type="xs:string" minOccurs="0"/>
        <xs:element name="FontSize" type="xs:int" minOccurs="0"/>
        <xs:element name="FontColor" type="tt:OSDColor" minOccurs="0"/>
        <xs:element name="BackgroundColor" type="tt:OSDColor" minOccurs="0"/>
        <xs:element name="PlainText" type="xs:string" minOccurs="0"/>
    </xs:sequence>
</xs:complexType>
```

FIG. 7F

```xml
<xs:complexType name="OSDImgConfiguration">
    <xs:sequence>
        <xs:element name="ImgPath" type="xs:anyURI"/>
        <xs:element name="Extension" type="tt:OSDImgConfigurationExtension" minOccurs="0"/>
    </xs:sequence>
</xs:complexType>
```

FIG. 7G

```xml
<xs:complexType name="OSDConfigurationExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 7H

```xml
<xs:complexType name="OSDColor">
    <xs:sequence>
        <xs:element name="Color" type="tt:Color"/>
    </xs:sequence>
    <xs:attribute name="Transparent" type="xs:int" use="optional"/>
</xs:complexType>
```

FIG. 7I

```xml
<xs:complexType name="Color">
    <xs:attribute name="X" type="xs:float" use="required"/>
    <xs:attribute name="Y" type="xs:float" use="required"/>
    <xs:attribute name="Z" type="xs:float" use="required"/>
    <xs:attribute name="Colorspace" type="xs:anyURI"/>
</xs:complexType>
```

FIG. 8A

```
<xs:complexType name="VideoSourceConfiguration">
    <xs:complexContent>
        <xs:extension base="tt:ConfigurationEntity">
            <xs:sequence>
                <xs:element name="SourceToken" type="tt:ReferenceToken"></xs:element>
                <xs:element name="Bounds" type="tt:IntRectangle"></xs:element>
                <xs:element name="Extension" type="tt:VideoSourceConfigurationExtension" minOccurs="0"/>
            </xs:sequence>
        </xs:extension>
    </xs:complexContent>
</xs:complexType>
```

FIG. 8B

```
<xs:simpleType name="ReferenceToken">
    <xs:restriction base="xs:string">
        <xs:maxLength value="64"/>
    </xs:restriction>
</xs:simpleType>
```

FIG. 8C

```
<xs:complexType name="IntRectangle">
    <xs:attribute name="x" type="xs:int" use="required"/>
    <xs:attribute name="y" type="xs:int" use="required"/>
    <xs:attribute name="width" type="xs:int" use="required"/>
    <xs:attribute name="height" type="xs:int" use="required"/>
</xs:complexType>
```

FIG. 8D

```
<xs:complexType name="VideoSourceConfigurationExtension">
    <xs:sequence>
        <xs:element name="Rotate" type="tt:Rotate" minOccurs="0"></xs:element>
    </xs:sequence>
</xs:complexType >
```

FIG. 8E

```
<xs:complexType name="Rotate">
    <xs:sequence>
        <xs:element name="Mode" type="tt:RotateMode"></xs:element>
        <xs:element name="Degree" type="xs:int" minOccurs="0"></xs:element>
    </xs:sequence>
    <xs:anyAttribute processContents="lax"/>
</xs:complexType>
```

FIG. 8F

```
<xs:simpleType name="RotateMode">
    <xs:restriction base="xs:string">
        <xs:enumeration value="OFF"/>
        <xs:enumeration value="ON"/>
        <xs:enumeration value="AUTO"/>
    </xs:restriction>
</xs:simpleType>
```

FIG. 9A
```
<xs:complexType name="MetadataStream">
    <xs:sequence>
        <xs:choice minOccurs="0" maxOccurs="unbounded">
            <xs:element name="VideoAnalytics" type="tt:VideoAnalyticsStream"/>
            <xs:element name="PTZ" type="tt:PTZStream"/>
            <xs:element name="Event" type="tt:EventStream"/>
            <xs:element name="Extension" type="tt:MetadataStreamExtension"/>
        </xs:choice>
    </xs:sequence>
</xs:complexType>
```

FIG. 9B
```
<xs:complexType name="VideoAnalyticsStream">
    <xs:choice minOccurs="0" maxOccurs="unbounded">
        <xs:element name="Frame" type="tt:Frame"/>
    </xs:choice>
</xs:complexType>
```

FIG. 9C
```
<xs:complexType name="PTZStream">
    <xs:choice minOccurs="0" maxOccurs="unbounded">
        <xs:element name="PTZStatus" type="tt:PTZStatus"/>
        <xs:element name="Extension" type="tt:PTZStreamExtension"/>
    </xs:choice>
</xs:complexType>
```

FIG. 9D
```
<xs:complexType name="EventStream">
    <xs:choice minOccurs="0" maxOccurs="unbounded">
        <xs:element ref="wsnt:NotificationMessage"/>
        <xs:element name="Extension" type="tt:EventStreamExtension"/>
    </xs:choice>
</xs:complexType>
```

FIG. 9E
```
<xs:complexType name="MetadataStreamExtension">
    <xs:sequence>
        <xs:any namespace="##any" processContents="lax" minOccurs="0" maxOccurs="unbounded"/>
    </xs:sequence>
</xs:complexType>
```

FIG. 10A

```
<xs:complexType name="Frame">
    <xs:sequence>
        <xs:element name="PTZStatus" type="tt:PTZStatus" minOccurs="0"/>
        <xs:element name="Transformation" type="tt:Transformation" minOccurs="0"/>
        <xs:element name="Object" type="tt:Object" minOccurs="0" maxOccurs="unbounded"/>
        <xs:element name="ObjectTree" type="tt:ObjectTree" minOccurs="0"/>
        <xs:element name="Extension" type="tt:FrameExtension" minOccurs="0"/>
    </xs:sequence>
    <xs:attribute name="UtcTime" type="xs:dateTime" use="required"/>
</xs:complexType>
```

FIG. 10B

```
<xs:complexType name="Object">
    <xs:complexContent>
        <xs:extension base="tt:ObjectId">
            <xs:sequence>
                <xs:element name="Appearance" type="tt:Appearance" minOccurs="0"/>
                <xs:element name="Behaviour" type="tt:Behaviour" minOccurs="0"/>
                <xs:element name="Extension" type="tt:ObjectExtension" minOccurs="0"/>
            </xs:sequence>
        </xs:extension>
    </xs:complexContent>
</xs:complexType>
```

FIG. 10C

```
<xs:complexType name="Appearance">
    <xs:sequence>
        <xs:element name="Transformation" type="tt:Transformation" minOccurs="0"/>
        <xs:element name="Shape" type="tt:ShapeDescriptor" minOccurs="0"/>
        <xs:element name="Color" type="tt:ColorDescriptor" minOccurs="0"/>
        <xs:element name="Class" type="tt:ClassDescriptor" minOccurs="0"/>
        <xs:element name="Extension" type="tt:AppearanceExtension" minOccurs="0"/>
    </xs:sequence>
</xs:complexType>
```

FIG. 10D

```
<xs:complexType name="ShapeDescriptor">
    <xs:sequence>
        <xs:element name="BoundingBox" type="tt:Rectangle"/>
        <xs:element name="CenterOfGravity" type="tt:Vector"/>
        <xs:element name="Polygon" type="tt:Polygon" minOccurs="0" maxOccurs="unbounded"/>
        <xs:element name="Extension" type="tt:ShapeDescriptorExtension" minOccurs="0"/>
    </xs:sequence>
</xs:complexType>
```

FIG. 10E

```
<xs:complexType name="Rectangle">
    <xs:attribute name="bottom" type="xs:float"/>
    <xs:attribute name="top" type="xs:float"/>
    <xs:attribute name="right" type="xs:float"/>
    <xs:attribute name="left" type="xs:float"/>
</xs:complexType>
```

FIG. 10F

```
<xs:complexType name="Vector">
    <xs:attribute name="x" type="xs:float"/>
    <xs:attribute name="y" type="xs:float"/>
</xs:complexType>
```

FIG. 19A

```
<tev8:MetadataStream>
    <tev8:VideoAnalytics>
        <tev8:Frame>
            <tev8:Object>
                <tev8:Appearance>
                    <tev8:Shape>
                        <tev8:BoundingBox left="40.000000" right="44.000000" top="17.000000" bottom="21.000000"></>
                        <tev8:CenterOfGravity x="42.000000" y="20.000000"></>
                    </tev8:Shape>
                </tev8:Appearance>
                ...
            </tev8:Object>
        </tev8:Frame>
    </tev8:VideoAnalytics>
</tev8:MetadataStream>
```

FIG. 19B

```
<tev8:MetadataStream>
    <tev8:VideoAnalytics>
        <tev8:Frame>
            <tev8:Object>
                <tev8:Appearance>
                    <tev8:Shape>
                        <tev8:BoundingBox left="13.000000" right="17.000000" top="40.000000" bottom="44.000000"></>
                        <tev8:CenterOfGravity x="15.000000" y="42.000000"></>
                    </tev8:Shape>
                </tev8:Appearance>
                ...
            </tev8:Object>
        </tev8:Frame>
    </tev8:VideoAnalytics>
</tev8:MetadataStream>
```

FIG. 20A
```
<tt:GetOSDsResponse>
    <tt:OSD token="osd1">
        <tt:VideoSourceConfigurationToken>0</tt:VideoSourceConfigurationToken>
        <tt:Type>Text</tt:Type>
        <tt:Position>
            <tt:Type>Custom</tt:Type>
            <tt:Pos x="0.8" y="-0.9">
            </tt:Pos>
        </tt:Position>
        <tt:TextString>
            <tt:Type>Date</tt:Type>
            <tt:DateFormat>yyyy/MM/dd</tt:DateFormat>
            <tt:FontColor Z="0.000000" Y="0.000000" X="0.000000"></tt:FontColor>
        </tt:TextString>
    </tt:OSD>
</tt:GetOSDsResponse>
```

FIG. 20B
```
<tt:GetOSDsResponse>
    <tt:OSD token="osd1">
        <tt:VideoSourceConfigurationToken>0</tt:VideoSourceConfigurationToken>
        <tt:Type>Text</tt:Type>
        <tt:Position>
            <tt:Type>Custom</tt:Type>
            <tt:Pos x="0.4" y="-0.1">
            </tt:Pos>
        </tt:Position>
        <tt:TextString>
            <tt:Type>Plain</tt:Type>
            <tt:BackgroundColor>
                <tt:Color Z="196.000000" Y="196.000000" X="196.000000"></tt:Color>
            </tt:BackgroundColor>
            <tt:PlainText>    </tt:PlainText>
        </tt:TextString>
    </tt:OSD>
</tt:GetOSDsResponse>
```

FIG. 20C
```
<tt:GetOSDsResponse>
    <tt:OSD token="osd1">
        <tt:VideoSourceConfigurationToken>0</tt:VideoSourceConfigurationToken>
        <tt:Type>Text</tt:Type>
        <tt:Position>
            <tt:Type>Custom</tt:Type>
            <tt:Pos x="-0.1" y="-0.4">
            </tt:Pos>
        </tt:Position>
        <tt:TextString>
            <tt:Type>Plain</tt:Type>
            <tt:BackgroundColor>
                <tt:Color Z="196.000000" Y="196.000000" X="196.000000"></tt:Color>
            </tt:BackgroundColor>
            <tt:PlainText>    </tt:PlainText>
        </tt:TextString>
    </tt:OSD>
</tt:GetOSDsResponse>
```

IMAGE PICKUP APPARATUS, IMAGE CAPTURING SYSTEM, METHOD OF CONTROLLING IMAGE PICKUP APPARATUS, METHOD OF CONTROLLING IMAGE CAPTURING SYSTEM, AND PROGRAM

TECHNICAL FIELD

The present invention relates to an image pickup apparatus, an image capturing system, a method of controlling the image pickup apparatus, a method of controlling the image capturing system, and a program. In particular, the present invention relates to a technology to rotate a captured image.

BACKGROUND ART

Image pickup apparatuses capable of rotating captured images captured by image capturing units have hitherto been known.

PTL 1 discloses an image pickup apparatus that rotates a captured image captured by an image capturing unit to distribute the rotated image to a client apparatus via a network.

For example, a superimposed image superimposed on a certain position of the captured image and a mask image are known as information concerning the captured image captured by the image capturing unit. The superimposed image is an image composed of certain characters and graphics.

PTL 2 discloses an image pickup apparatus that, in response to movement of a case of a camera in a pan direction or a tilt direction, moves the position of a cursor on a display screen in accordance with the direction in which the case is moved.

PTL 3 discloses an image pickup apparatus that superimposes a mask image while continuing masking of a certain subject even if a camera changes the image capturing direction with panning or tilting.

However, with the technology disclosed in PTL 1, the rotation of the captured image captured by the image capturing unit may cause mismatch between the captured image and the information concerning the captured image, such as the superimposed image or the mask image.

CITATION LIST

Patent Literature

PTL 1: International Publication No. 2013/072981
PTL 2: Japanese Patent Laid-Open No. 7-131684
PTL 3: Japanese Patent Laid-Open No. 2001-069494

SUMMARY OF INVENTION

The present invention provides a technology to rotate an appropriate piece of information, among pieces of information concerning a captured image, in accordance with rotation of the captured image.

Solution to Problem

According to an embodiment of the present invention, an image pickup apparatus capable of communicating with an external apparatus includes an image capturing unit configured to capture an image of a subject to generate a captured image, a superimposing unit configured to superimpose first information and second information on the captured image supplied from the image capturing unit, and a control unit configured to rotate the captured image supplied from the image capturing unit in a state in which a position of the first information superimposed by the superimposing unit relative to a position of the subject is changed while a position of the second information superimposed by the superimposing unit relative to the position of the subject is kept unchanged.

Further features of the present invention will become apparent from the following description of exemplary embodiments with reference to the attached drawings.

BRIEF DESCRIPTION OF DRAWINGS

FIG. 7A illustrates an exemplary definition of an OSD-Configuration type according to the embodiment.
FIG. 7B illustrates an exemplary definition of an OSDReference type according to the embodiment.
FIG. 7C illustrates an exemplary definition of an OSD-Type type according to the embodiment.
FIG. 7D illustrates an exemplary definition of an OSD-PosConfiguration type according to the embodiment.
FIG. 7E illustrates an exemplary definition of an OSD-TextConfiguration type according to the embodiment.
FIG. 7F illustrates an exemplary definition of an OSDImgConfiguration type according to the embodiment.
FIG. 7G illustrates an exemplary definition of an OSD-ConfigurationExtension type according to the embodiment.
FIG. 7H illustrates an exemplary definition of an OSD-Color type according to the embodiment.
FIG. 7I illustrates an exemplary definition of a Color type according to the embodiment.
FIG. 8A illustrates an exemplary definition of a VideoSourceConfiguration type according to the embodiment.
FIG. 8B illustrates an exemplar definition of a ReferenceToken type according to the embodiment.
FIG. 8C illustrates an exemplary definition of an IntRectangle type according to the embodiment.
FIG. 8D illustrates an exemplary definition of a VideoSourceConfigurationExtension type according to the embodiment.
FIG. 8E illustrates an exemplary definition of a Rotate type according to the embodiment.
FIG. 8F illustrates an exemplary definition of a RotateMode type according to the embodiment.
FIG. 9A illustrates an exemplary definition of a MetadataStream type according to the embodiment.

FIG. 9B illustrates an exemplary definition of a VideoAnalyticsStream type according to the embodiment.

FIG. 9C illustrates an exemplary definition of a PTZStream type according to the embodiment.

FIG. 9D illustrates an exemplary definition of an EventStream type according to the embodiment.

FIG. 9E illustrates an exemplary definition of a MetadataStreamExtension type according to the embodiment.

FIG. 10A illustrates an exemplary definition of a Frame type according to the embodiment.

FIG. 10B illustrates an exemplary definition of an Object type according to the embodiment.

FIG. 10C illustrates an exemplary definition of an Appearance type according to the embodiment.

FIG. 10D illustrates an exemplary definition of a ShapeDescriptor type according to the embodiment.

FIG. 10E illustrates an exemplary definition of a Rectangle type according to the embodiment.

FIG. 10F illustrates an exemplary definition of a Vector type according to the embodiment.

FIG. 19A illustrates an exemplary structure of MetadataStream according to the embodiment.

FIG. 19B illustrates another exemplary structure of the MetadataStream according to the embodiment.

FIG. 20A illustrates an exemplary structure of a GetOSDs response according to the embodiment.

FIG. 20B illustrates another exemplary structure of the GetOSDs response according to the embodiment.

FIG. 20C illustrates another exemplary structure of the GetOSDs response according to the embodiment.

DESCRIPTION OF EMBODIMENTS

Embodiments of the present invention will herein be described in detail with reference to the attached drawings. Configurations illustrated in the following embodiments are only examples and the present invention is not limited to the configurations described in the following embodiments. It is assumed that commands and coordinate systems in the following embodiments are defined on the basis of, for example, Open Network Video Interface Forum (hereinafter referred to as ONVIF) standard.

The configuration of a network according to an embodiment will now be described with reference to FIG. 1A and FIG. 1B.

Figure 1A:
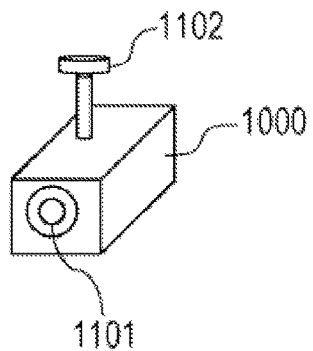
FIG. 1A illustrates an example of a monitoring camera according to an embodiment of the present invention.

FIG. 1A illustrates an example of a monitoring camera according to the present embodiment. Referring to FIG. 1A and FIG. 1B, a monitoring camera 1000 includes a case 1101 including a lens and an arm mechanism 1102. The arm mechanism 1102 is used to hang the monitoring camera 1000 from a position, such as a ceiling, where the monitoring camera 1000 is mounted. The arm mechanism 1102 is capable of rotating the monitoring camera 1000 in the pan direction and the tilt direction to change the image capturing direction of the monitoring camera 1000 and is capable of fixing the image capturing direction.

The monitoring camera 1000 in the present embodiment is an image pickup apparatus that captures a moving image. More specifically, the monitoring camera 1000 is a network camera used for monitoring. The arm mechanism 1102 is provided with a stepping motor to rotate the case 1101 in the pan direction and a stepping motor to rotate the case 1101 in the tilt direction.

Figure 1B:
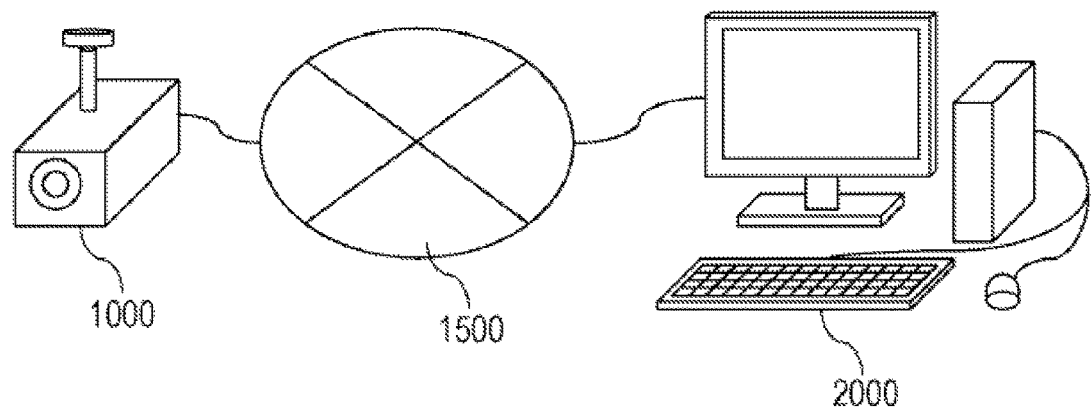
FIG. 1B illustrates an exemplary system configuration of a monitoring system according to the embodiment.

FIG. 1B illustrates an exemplary system configuration of a monitoring system according to the present embodiment.

In the monitoring system in the present embodiment, the monitoring camera 1000 is connected to a client apparatus 2000 via an IP network 1500 (via a network) so as to communicate with the client apparatus 2000. The client apparatus 2000 in the present embodiment is an example of an external apparatus, such as a personal computer (PC). The monitoring system in the present embodiment corresponds to an image capturing system.

The IP network 1500 is composed of multiple routers, switches, cables, and so on meeting a communication standard, such as Ethernet (registered trademark). However, in the present embodiment, the communication standard, the size of the IP network 1500, and the configuration of the IP network 1500 are not specifically limited as long as the monitoring camera 1000 is capable of communicating with the client apparatus 2000 via the IP network 1500.

For example, the IP network 1500 may be composed of, for example, the Internet, a wired local area network (LAN), a wireless LAN, or a wide area network (WAN). The monitoring camera 1000 in the present embodiment may support, for example, Power Over Ethernet (PoE) (registered trademark) and power may be supplied to the monitoring camera 1000 through a LAN cable.

The client apparatus 2000 transmits various commands to the monitoring camera 1000. These commands include, for example, a command to change an image capturing parameter and a command to start image streaming. These commands will be described in detail below. The monitoring camera 1000 transmits responses to the commands and the image streaming to the client apparatus 2000.

Figure 2:
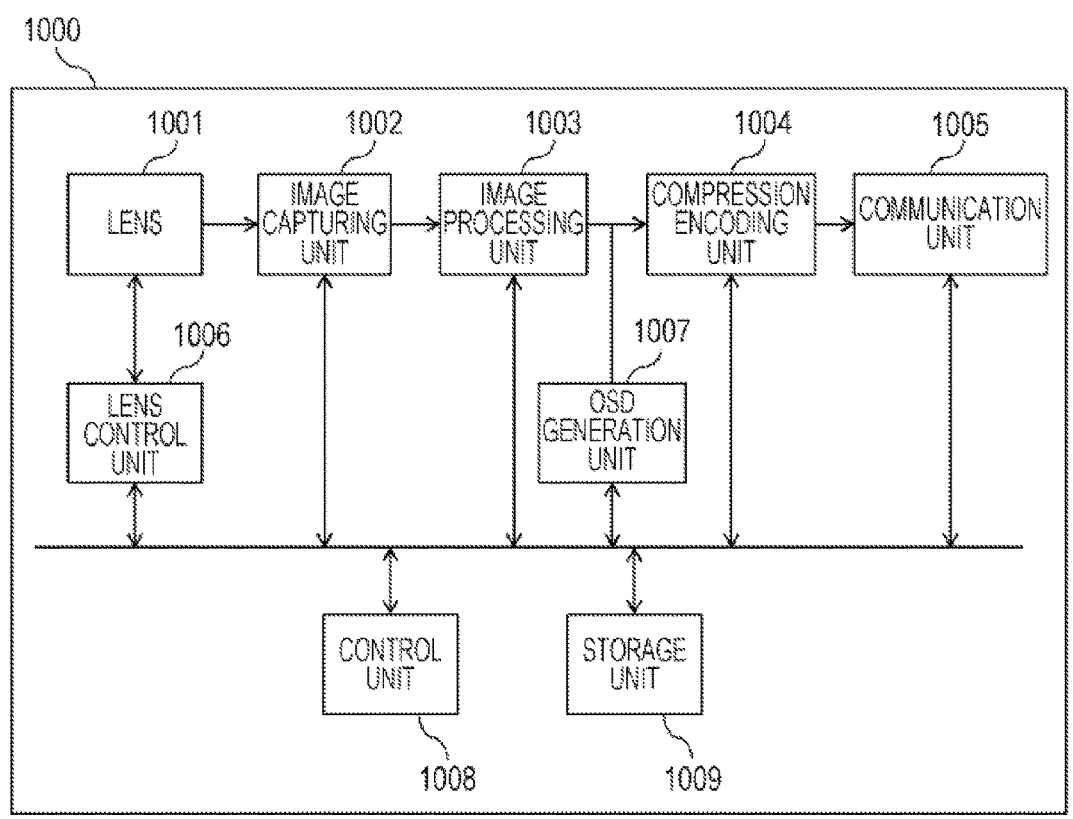
FIG. 2 is a block diagram illustrating an exemplary hardware configuration of the monitoring camera according to the embodiment.

FIG. 2 is a block diagram illustrating an exemplary hardware configuration of the monitoring camera 1000 according to the present embodiment. Referring to FIG. 2, a lens 1001 forms an image of a subject on an image capturing unit 1002. The image capturing unit 1002 captures the image of the subject formed by the lens 1001 to generate a captured image. The image capturing unit 1002 supplies the generated captured image to an image processing unit 1003.

The image processing unit 1003 performs image processing to the captured image supplied from the image capturing unit 1002 in accordance with an instruction from a control unit 1008 described below. The image processing unit 1003 supplies the captured image subjected to the image processing to a compression encoding unit 1004 as a distributed image. The compression encoding unit 1004 compresses and encodes the distributed image supplied from the image processing unit 1003 in accordance with an instruction from the control unit 1008.

The image processing unit 1003 is capable of detecting an object included in the captured image supplied from the image capturing unit 1002. For example, the image processing unit 1003 is capable of detecting a moving object included in the captured image supplied from the image capturing unit 1002.

A communication unit 1005 distributes the distributed image subjected the compression and the encoding in the compression encoding unit 1004 to the client apparatus 2000 via the IP network 1500. The communication unit 1005 receives an On-Screen Display (OSD) setting command transmitted from the client apparatus 2000 via the IP network 1500. In addition, the communication unit 1005 receives an encoding setting command transmitted from the client apparatus 2000 via the IP network 1500.

Furthermore, the communication unit 1005 receives a setting command for the captured image (hereinafter sometimes referred to as an image setting command). The image setting command is, for example, a setting command of the image size or a setting command concerning exposure control, such as white balancing and gain, for the subject image.

A lens control unit 1006 controls the lens 1001 so that the aperture is varied in accordance with the image of the subject to adjust the focus position for focusing in order to perform, for example, insertion and removal of an infrared ray cut-off filter. An OSD generation unit 1007 generates an OSD image in accordance with an instruction from the control unit 1008. The OSD generation unit 1007 supplies the generated OSD image to the compression encoding unit 1004.

In the present embodiment, the OSD image corresponding to character information is composed of characters including alphanumeric characters and symbols and the background of the characters. In the present embodiment, the OSD image corresponding to graphic information is composed of graphics and the background of the graphics. Colors (background colors) may be set for the background of the characters and the background of the graphics.

The compression encoding unit 1004 combines the OSD image supplied from the OSD generation unit 1007 with the distributed image supplied from the image processing unit 1003. For example, the compression encoding unit 1004 superimposes the OSD image supplied from the OSD generation unit 1007 on the distributed image supplied from the image processing unit 1003. The compression encoding unit 1004 compresses and encodes the combined distributed image. The compression encoding unit 1004 supplies the distributed image subjected to the compression and the encoding to the communication unit 1005.

The compression encoding unit 1004 in the present embodiment corresponds to a superimposing unit that superimposes the OSD image on the captured image supplied from the image capturing unit 1002. The OSD image in the present embodiment corresponds to superimposition information.

The control unit 1008 controls the entire monitoring camera 1000. The control unit 1008 is composed of, for example, a central processing unit (CPU) and executes programs stored in a storage unit 1009 described below. The control unit 1008 may perform the control using hardware.

The control unit 1008 analyzes the image setting command received with the communication unit 1005. Then, the control unit 1008 generates image setting information on the basis of the analyzed image setting command. The control unit 1008 supplies the generated image setting information to the image processing unit 1003 and stores the generated image setting information in the storage unit 1009 concurrently with the supply of the image setting information. The image setting information includes rotation information concerning the rotation of the captured image.

Upon activation of the monitoring camera 1000, the control unit 1008 reads out the image setting information stored in the storage unit 1009 and supplies the image setting information that is read out to the image processing unit 1003. The image processing unit 1003 performs the image processing to the captured image supplied from the image capturing unit 1002 in accordance with the image setting information supplied from the control unit 1008 and supplies the distributed image subjected to the image processing to the compression encoding unit 1004.

The control unit 1008 analyzes the OSD setting command received with the communication unit 1005. Then, the control unit 1008 generates OSD setting information on the basis of the analyzed OSD setting command. The control unit 1008 supplies the generated OSD setting information to the OSD generation unit 1007 and stores the generated OSD setting information in the storage unit 1009 concurrently with the supply of the OSD setting information.

The OSD generation unit 1007 generates the OSD image in accordance with the OSD setting information supplied from the control unit 1008. It is assumed that one OSD image is generated from one piece of OSD setting information. The OSD setting information includes the color of the OSD image, superimposition position information, and so on. The superimposition position information indicates the position where the OSD image is superimposed on the distributed image supplied from the image processing unit 1003.

The control unit 1008 analyzes the encoding setting command received with the communication unit 1005. Then, the control unit 1008 generates encoding setting information on the basis of the analyzed encoding setting command. The control unit 1008 stores the generated encoding setting information in the storage unit 1009 and, then, supplies the generated encoding setting information to the compression encoding unit 1004.

The encoding setting information supplied from the control unit 1008 includes specification information concerning, for example, an encoding method of data and the image size (or the resolution of the image).

The compression encoding unit 1004 converts the distributed image supplied from the image processing unit 1003 into the image size or the resolution of the image specified in the encoding setting information supplied from the control unit 1008. Alternatively, the compression encoding unit 1004 may convert an image resulting from combination of the distributed image supplied from the image processing unit 1003 with the OSD image supplied from the OSD generation unit 1007 into the image size or the resolution of the image specified in the encoding setting information supplied from the control unit 1008.

The compression encoding unit 1004 compresses and encodes the converted distributed image with the encoding method specified in the encoding setting information supplied from the control unit 1008. In the present embodiment, the encoding method that is specified is, for example, Joint Photographic Experts Group (JPEG), Moving Picture Experts Group (MPEG), H.264, or H.265.

The monitoring camera 1000 in the present embodiment, which operates in the above manner, is capable of converting an image of the same subject into multiple images having different image sizes. Then, the monitoring camera 1000 is capable of compressing and encoding the multiple images resulting from the conversion into multiple images using different encoding methods. The monitoring camera 1000 is capable of substantially simultaneously performing streaming delivery of the images subjected to the compression and the encoding.

The images to be subjected to the streaming delivery are externally output through the communication unit 1005.

Figure 3:
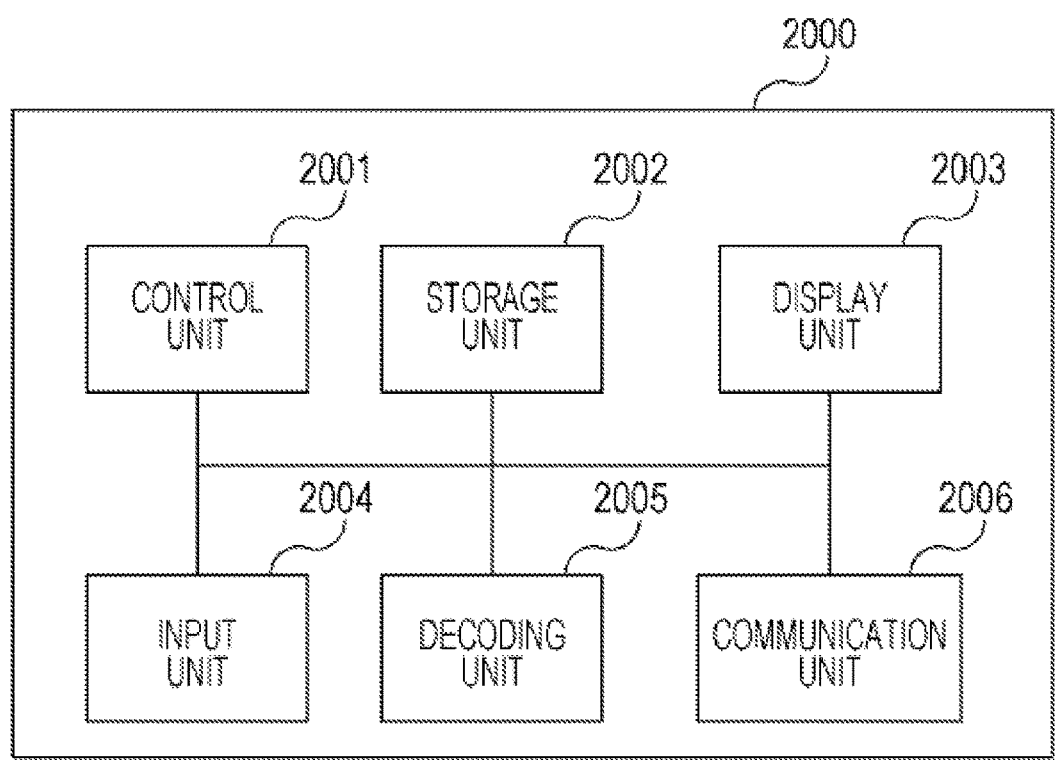
FIG. 3 is a block diagram illustrating an exemplary hardware configuration of a client apparatus according to the embodiment.

FIG. 3 is a block diagram illustrating an exemplary hardware configuration of the client apparatus 2000 according to the present embodiment. The client apparatus 2000 in the present embodiment is a computer apparatus connected to the IP network 1500.

Referring to FIG. 3, a control unit 2001 controls the entire client apparatus 2000. The control unit 2001 is composed of, for example, a CPU and executes programs stored in a storage unit 2002 described below. The control unit 2001 may perform the control using hardware. The storage unit 2002 is used as an area in which programs executed by the control unit 2001 are stored, a working area during the execution of the programs, and an area where data is stored.

A communication unit 2006 transmits a command and so on to the monitoring camera 1000 in response to an instruction from the control unit 2001. The communication unit 2006 receives a response to the command, an image subjected to the streaming delivery, and so on from the monitoring camera 1000 in response to an instruction from the control unit 2001.

An input unit 2004 is composed of, for example, buttons, arrow keys, a touch panel, and a mouse. The input unit 2004 accepts input of an instruction from a user. For example, the input unit 2004 is capable of accepting input of an instruction to transmit various commands to the monitoring camera 1000 as the instruction from the user.

The input unit 2004 is capable of accepting input of a response from the user to, for example, an inquiry message to the user, which is generated by the control unit 2001 that executes a program stored in the storage unit 2002.

A decoding unit 2005 decodes and decompresses an image supplied from the communication unit 2006. The decoding unit 2005 supplies the image subjected to the decoding and the decompression to a display unit 2003. The display unit 2003 displays the image supplied from the decoding unit 2005. The display unit 2003 is capable of displaying, for example, the inquiry message to the user, which is generated by the control unit 200 that executes the program stored in the storage unit 2002.

The display unit 2003 in the present embodiment is, for example, a liquid crystal display (LCD) or an organic electroluminescent (EL) display.

Although the internal configurations of the monitoring camera 1000 and the client apparatus 2000 are described above, the processing blocks illustrated in FIG. 2 and FIG. 3 are illustrated for description of the image pickup apparatus and the external apparatus according to the embodiments of the present invention and the present invention is not limited to the processing block illustrated in FIG. 2 and FIG. 3. Many changes and modified embodiments will be obvious to those skilled in the art without departing from the true spirit and scope of the invention. For example, an audio input unit and an audio output unit may be provided.

Figure 4:
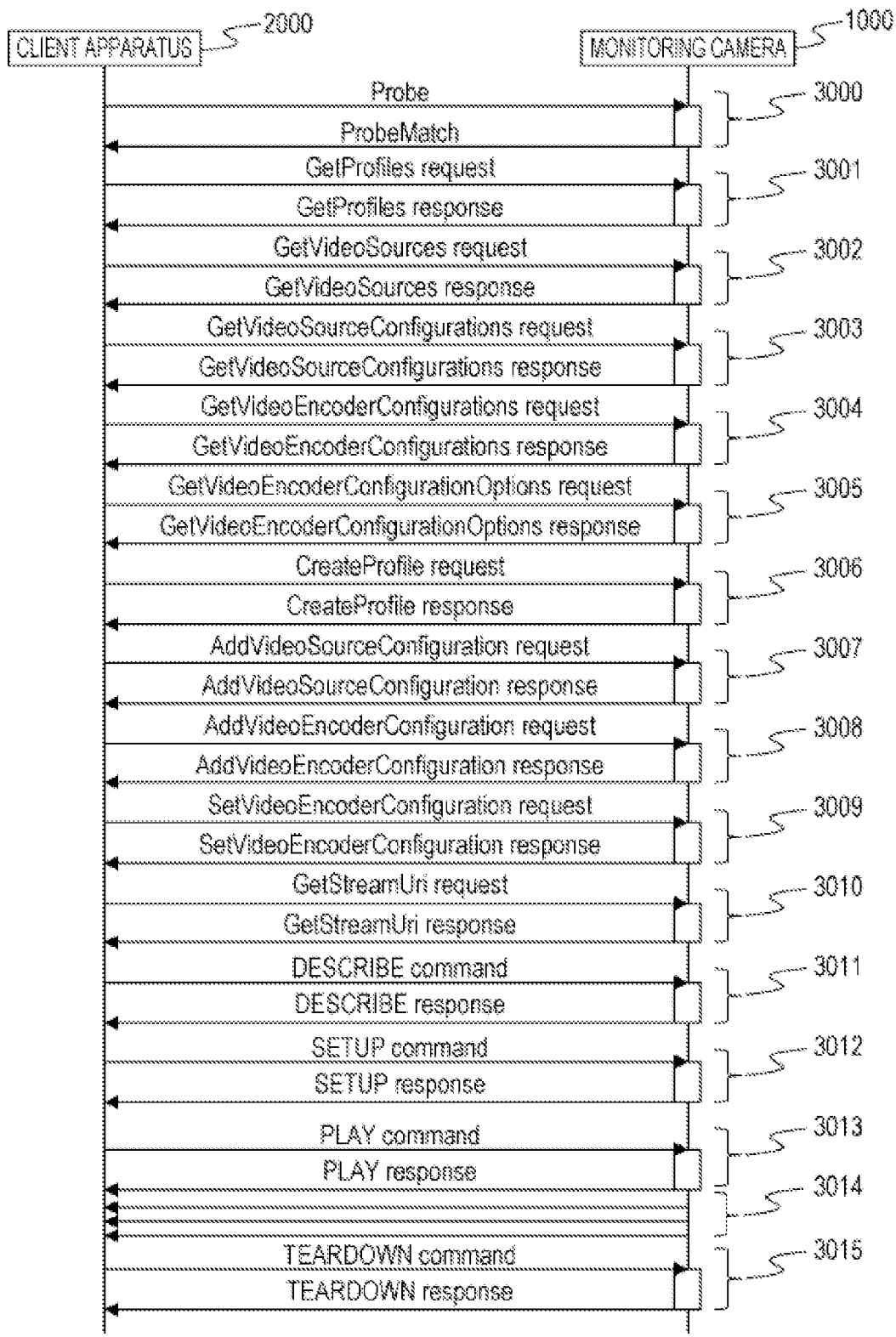
FIG. 4 is a sequence diagram for description of a command sequence between the monitoring camera and the client apparatus according to the embodiment.

FIG. 4 is a sequence diagram for description of a typical command sequence from start of setting of parameters of images to be subjected to the streaming delivery to the streaming delivery of the images between the monitoring camera 1000 and the client apparatus 2000.

A transaction in the present embodiment represents a pair of a command to be transmitted from the client apparatus 2000 to the monitoring camera 1000 and a response returned from the monitoring camera 1000 to the client apparatus 2000 in response to the command.

Referring to FIG. 4, reference numeral 3000 denotes a device search transaction. The client apparatus 2000 multicasts a Probe command (a search request) including a certain search condition to search for the monitoring camera connected to the network.

Among the monitoring cameras that have received the Probe command, the monitoring camera meeting the search condition returns a ProbeMatch command (a search response) to the client apparatus 2000, which has transmitted the Probe command. Then, the search is terminated.

Reference numeral 3001 denotes a GetProfiles transaction. The GetProfiles transaction is a transaction to acquire MediaProfile corresponding to a distribution profile. The client apparatus 2000 transmits a GetProfiles command to the monitoring camera 1000.

The monitoring camera 1000, which has received the GetProfiles command, transmits a list of MediaProfiles to the client apparatus 2000. The client apparatus 2000 acquires the list of MediaProfiles currently available in the monitoring camera 1000, along with a distribution profile identifier (ID) for identifying the MediaProfile.

The client apparatus 2000 identifies a distribution profile setting that exists in the monitoring camera 1000 and that can be distributed with the distribution profile ID.

Reference numeral 3002 denotes a GetVideoSources transaction. The GetVideoSources transaction is a transaction to acquire the function of the image processing unit 1003 (an image processing function).

The client apparatus 2000 transmits a GetVideoSources command to the monitoring camera 1000. The monitoring camera 1000, which has received the GetVideoSources command, returns a response to the command to the client apparatus 2000. Through the GetVideoSources transaction, the client apparatus 2000 acquires the setting information about the image processing function stored in the monitoring camera 1000.

Reference numeral 3003 denotes a GetVideoSourceConfigurations transaction. The GetVideoSourceConfigurations transaction is a transaction to acquire a list of image processing settings from the monitoring camera 1000. The client apparatus 2000 transmits a GetVideoSourceConfigurations command to the monitoring camera 1000.

The monitoring camera 1000, which has received the GetVideoSourceConfigurations command, returns the list of the image processing settings stored in the monitoring camera 1000, which includes the IDs, to the client apparatus 2000. This list is an example of the image setting information generated by the control unit 1008.

Reference numeral 3004 denotes a GetVideoEncoderConfigurations transaction. The GetVideoEncoderConfigurations transaction is a transaction to acquire the function of the compression encoding unit 1004. The client apparatus 2000 transmits a GetVideoEncoderConfigurations command to the monitoring camera 1000. The monitoring camera 1000, which has received the GetVideoEncoderConfigurations command, returns a response to the command.

Through the GetVideoEncoderConfigurations transaction, the client apparatus 2000 acquires information concerning the function provided by the compression encoding unit 1004 in the monitoring camera 1000. This information is an example of the encoding setting information generated by the control unit 1008.

Reference numeral 3005 denotes a GetVideoEncoderConfigurationOptions transaction. The GetVideoEncoderConfigurationOptions transaction is a transaction to acquire a list of settings for the compression encoding unit 1004. The client apparatus 2000 transmits a GetVideoEncoderConfigurationOptions command to the monitoring camera 1000.

The monitoring camera 1000, which has received the GetVideoEncoderConfigurationOptions command, returns a response to the command Through the GetVideoEncoderConfigurationOptions transaction, the client apparatus 2000 acquires options of a compression encoding setting stored in the storage unit 1009, which includes the IDs, from the monitoring camera 1000.

Reference numeral 3006 denotes a CreateProfile transaction. The CreateProfile transaction is a transaction to request creation of the distribution profile. The client apparatus 2000 transmits a CreateProfile command to the monitoring camera 1000. The monitoring camera 1000, which has received the CreateProfile command, returns a response to the command.

Through the CreateProfile transaction, the client apparatus 2000 creates anew distribution profile in the monitoring camera 1000 to acquire the ID of the created distribution profile. The monitoring camera 1000 stores the distribution profile that is newly created.

Reference numeral 3007 denotes an AddVideoSourceConfiguration transaction. The AddVideoSourceConfiguration transaction is a transaction to request addition of the image processing settings. The client apparatus 2000 transmits an AddVideoSourceConfiguration command to the monitoring camera 1000.

The monitoring camera 1000, which has received the AddVideoSourceConfiguration command, returns a response to the command to the client apparatus 2000. Through the AddVideoSourceConfiguration transaction, the client apparatus 2000 specifies the ID of the distribution profile created in the CreateProfile transaction 3006 and the ID of each image processing setting acquired in the GetVideoSourceConfigurations transaction 3003. The monitoring camera 1000 stores the specified image processing setting in association with the specified distribution profile.

The AddVideoSourceConfiguration command in the AddVideoSourceConfiguration transaction 3007 is an example of the image setting command.

Reference numeral 3008 denotes an AddVideoEncoderConfiguration transaction. The AddVideoEncoderConfiguration transaction is a transistor to request addition of the compression encoding setting. The client apparatus 2000 transmits an AddVideoEncoderConfiguration command to the monitoring camera 1000. The monitoring camera 1000 returns a response to the command to the client apparatus 2000.

Through the AddVideoEncoderConfiguration transaction, the client apparatus 2000 specifies the ID of the distribution profile created in the CreateProfile transaction 3006 and the ID of the compression encoding setting acquired in the GetVideoEncoderConfigurationOptions transaction 3005 to associate the compression encoding setting with the distribution profile. The monitoring camera 1000 stores the specified compression encoding setting in association with the specified distribution profile.

Reference numeral 3009 denotes a SetVideoEncoderConfiguration transaction. The SetVideoEncoderConfiguration transaction is a transaction to change the compression encoding setting. The client apparatus 2000 transmits a SetVideoEncoderConfiguration command to the monitoring camera 1000.

The monitoring camera 1000, which has received the SetVideoEncoderConfiguration command, returns a response to the command. Through the SetVideoEncoderConfiguration transaction, the client apparatus 2000 changes the content of the compression encoding setting acquired in the GetVideoEncoderConfigurationOptions transaction 3005 on the basis of the options acquired in the GetVideoEncoderConfigurationOptions transaction 3005. For example, the client apparatus 2000 changes a compression encoding method and a cut-out size. The monitoring camera 1000 stores the content of the compression encoding setting that is changed.

The AddVideoEncoderConfiguration command in the AddVideoEncoderConfiguration transaction 3008 and the SetVideoEncoderConfiguration command in the SetVideoEncoderConfiguration transaction 3009 are examples of the encoding setting command described above.

Reference numeral 3010 denotes a GetStreamUri transaction. The GetStreamUri transaction is a transaction to request acquisition of a distribution address. Through the GetStreamUri transaction, the client apparatus 2000 specifies the ID of the distribution profile created in the CreateProfile transaction 3006 to acquire the distribution address used for acquiring a video to be distributed on the basis of the setting of the specified distribution profile.

The monitoring camera 1000 returns the distribution address used to distribute the image corresponding to the content of the image processing setting and the content of the compression encoding setting associated with the specified distribution profile ID to the client apparatus 2000.

Reference numeral 3011 is a DESCRIBE transaction. The DESCRIBE transaction is a transaction to request acquisition of distribution information. The client apparatus 2000 transmits a DESCRIBE command to the monitoring camera 1000. The monitoring camera 1000, which has received the DESCRIBE command, returns a response to the command to the client apparatus 2000.

Through the DESCRIBE transaction, the client apparatus 2000 specifies the distribution address acquired in the GetStreamUri transaction 3010 to acquire detailed data concerning the distribution information about the monitoring camera 1000.

Reference numeral 3012 is a SETUP transaction. The SETUP transaction is a transaction to request a distribution setting. The client apparatus 2000 transmits a SETUP command to the monitoring camera 1000. The monitoring camera 1000, which has received the SETUP command, returns a response to the command to the client apparatus 2000.

Through the SETUP transaction, the client apparatus 2000 causes the monitoring camera 1000 to prepare for the streaming on the basis of the detailed data concerning the distribution information acquired in the DESCRIBE transaction 3011. The SETUP command is executed to share the transmission method of the stream including a session number between the client apparatus 2000 and the monitoring camera 1000.

Reference numeral 3013 is a PLAY transaction. The PLAY transaction is a transaction to start the distribution. The client apparatus 2000 transmits a PLAY command to the monitoring camera 1000. The monitoring camera 1000, which has received the PLAY command, returns a response to the command to the client apparatus 2000.

In the transmission of the PLAY command to the monitoring camera 1000, the client apparatus 2000 uses the session number acquired in the SETUP transaction 3012 to cause the monitoring camera 1000 to start the streaming of the image based on the setting of the specified distribution profile.

Reference numeral 3014 is a stream delivered from the monitoring camera 1000 to the client apparatus 2000. The stream the start of the delivery of which is requested in the PLAY transaction 3013 is delivered with the transmission method shared in the SETUP transaction 3012. MetadataStream type data described below is also included in the stream in the transaction 3014.

Reference numeral 3015 is a TEARDOWN transaction. The TEARDOWN transaction is a transaction to stop the distribution. The client apparatus 2000 transmits a TEARDOWN command to the monitoring camera 1000. The monitoring camera 1000, which has received the TEARDOWN command, returns a response to the command.

Through the TEARDOWN transaction, the client apparatus 2000 specifies the session number acquired in the SETUP transaction 3012 to stop the stream that is being delivered.

Figure 5:
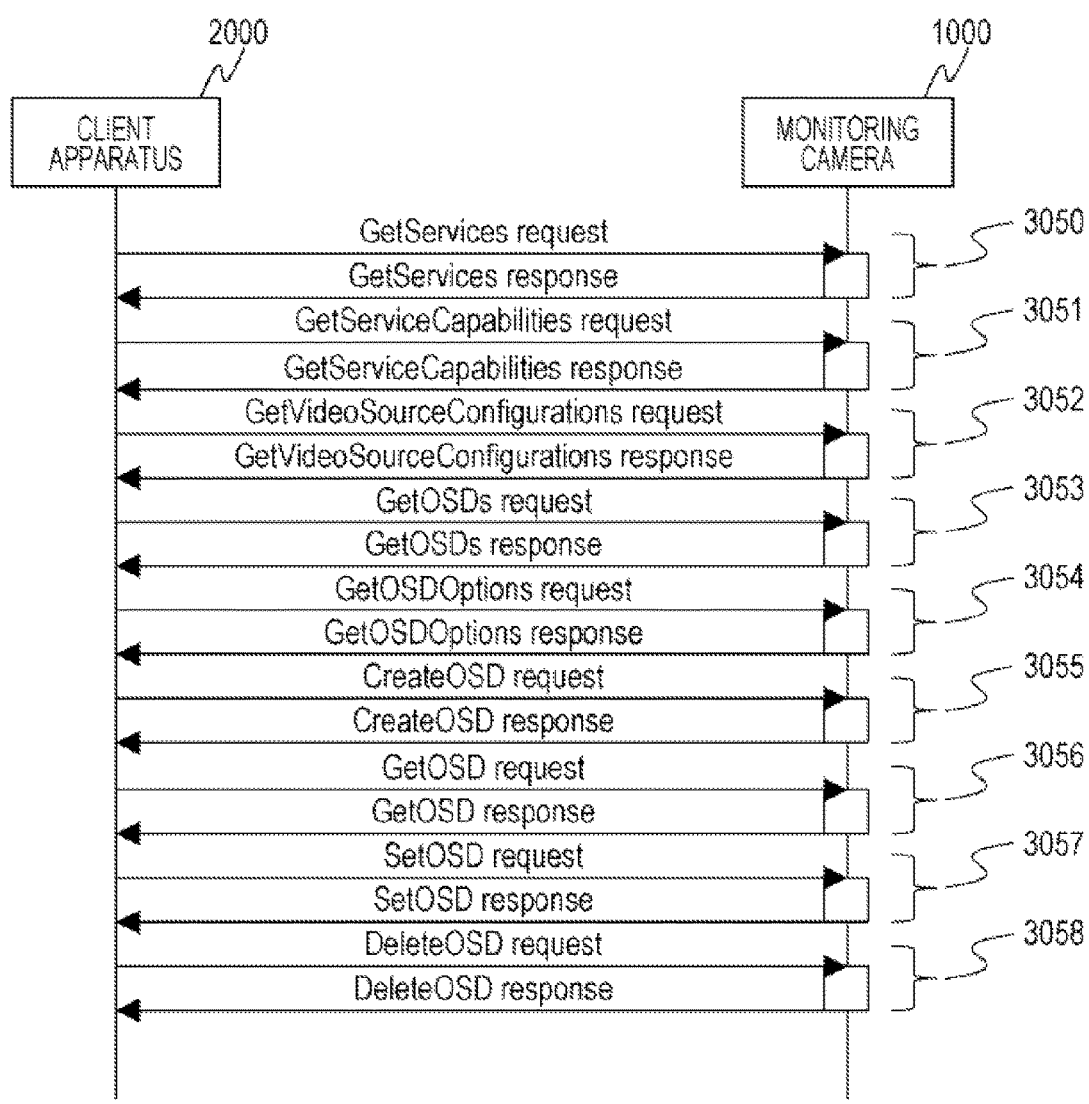
FIG. 5 is a sequence diagram for description of another command sequence between the monitoring camera and the client apparatus according to the embodiment.

FIG. 5 is a sequence diagram for description of a typical command sequence for, for example, setting an image superimposition process between the monitoring camera 1000 and the client apparatus 2000.

Referring to FIG. 5, reference numeral 3050 denotes a GetServices transaction. The GetServices transaction is a transaction to request acquisition of the function of the monitoring camera 1000. The client apparatus 2000 transmits a GetServices command to the monitoring camera 1000. The monitoring camera 1000, which has received the GetServices command, returns a response to the command.

Through the GetServices transaction, the client apparatus 2000 acquires a list of the functions of the monitoring camera 1000. The client apparatus 2000 confirms whether the monitoring camera 1000 supports the image processing function and the compression encoding function.

Reference numeral 3051 denotes a GetServiceCapabilities transaction. The GetServiceCapabilities transaction is a transaction to request acquisition of the function corresponding to the image superimposition process. The client apparatus 2000 transmits a GetServiceCapabilities command to the monitoring camera 1000. The monitoring camera 1000, which has received the GetServiceCapabilities transaction, returns a response to the command.

Through the GetServiceCapabilities transaction, the client apparatus 2000 confirms whether the monitoring camera WOO supports the image superimposition process. For example, the control unit 2001 receives information indicating whether the monitoring camera 1000 is capable of performing the image superimposition process from the monitoring camera 1000 through the communication unit 2006.

Reference numeral 3052 denotes a GetVideoSourceConfigurations transaction. The GetVideoSourceConfigurations transaction is a transaction to acquire a list of the image processing settings. The client apparatus 2000 transmits a GetVideoSourceConfigurations command to the monitoring camera 1000.

The monitoring camera 1000, which has received the GetVideoSourceConfigurations command, returns a response to the command to the client apparatus 2000. Through the GetVideoSourceConfigurations transaction, the client apparatus 2000 acquires the list of the image processing settings stored in the monitoring camera 1000, which includes the IDs, from the monitoring camera 1000.

The list of the image processing settings is an example of e image setting information generated by the control unit 1008.

Reference numeral 3053 denotes a GetOSDs transaction. The GetOSDs transaction is a transaction to request acquisition of a list of image superimposition settings. The client apparatus 2000 transmits a GetOSDs command to the monitoring camera 1000. The monitoring camera 1000, which has received the GetOSDs command, returns a response to the command to the client apparatus 2000.

Through the GetOSDs transaction, the client apparatus 2000 specifies the ID of each image processing setting acquired in the GetVideoSourceConfigurations transaction 3052. The client apparatus 2000 acquires a list of all the image superimposition settings, which includes OSDToken. The OSDToken is the ID of the image superimposition setting associated with each image processing setting stored in the monitoring camera 1000.

Reference numeral 3054 denotes a GetOSDOptions transaction. The GetOSDOptions transaction is a transaction to acquire options of the image superimposition settings. The client apparatus 2000 transmits a GetOSDOptions command to the monitoring camera 1000. The monitoring camera 1000, which has received the GetOSDOptions command, returns a response to the command to the client apparatus 2000.

Through the GetOSDOptions transaction, the client apparatus 2000 specifies the ID of each image processing setting acquired in the GetVideoSourceConfigurations transaction 3052. The client apparatus 2000 acquires options and the range of the settings that can be set for each parameter of the image superimposition setting associated with each image processing setting stored in the monitoring camera 1000.

Reference numeral 3055 denotes a CreateOSD transaction. The CreateOSD transaction is a transaction to create the image superimposition setting. The client apparatus 2000 transmits a CreateOSD command to the monitoring camera 1000. The monitoring camera 1000, which has received the CreateOSD command, returns a response to the command to the client apparatus 2000.

Through the CreateOSD transaction, the client apparatus 2000 is capable of creating a new image superimposition setting in the monitoring camera 1000 on the basis of the options acquired in the GetOSDOptions transaction 3054. The monitoring camera 1000 returns the OSDToken, which is the ID of the image superimposition setting, in accordance with the image superimposition setting specified by the client apparatus 2000.

Reference numeral 3056 denotes a GetOSD transaction. The GetOSD transaction is a transaction to request acquisition of the image superimposition setting. The client apparatus 2000 transmits a GetOSD command to the monitoring camera 1000. The monitoring camera 1000, which has received the GetOSD command, returns a response to the command to the client apparatus 2000.

Through the GetOSD transaction, the client apparatus 2000 acquires the image superimposition setting using the OSDToken, which is the ID of the image superimposition setting acquired in the CreateOSD transaction 3055. The response in the GetOSDs transaction 3053 and the response in the GetOSD transaction 3056 are examples of the OSD setting information generated by the control unit 1008.

Reference numeral 3057 is a SetOSD transaction. The SetOSD transaction is a transaction to change the image superimposition setting. The client apparatus 2000 transmits a SetOSD command to the monitoring camera 1000. The monitoring camera 1000, which has received the SetOSD command, returns a response to the command to the client apparatus 2000.

Through the SetOSD transaction, the client apparatus 2000 specifies the OSDToken, which is the ID of the image superimposition setting. The client apparatus 2000 is capable of changing the content of the image superimposition setting acquired in the GetOSD transaction 3056 and the content of the image superimposition setting newly created in the CreateOSD transaction 3055 on the basis of the options acquired in the GetOSDOptions transaction 3054. For example, the client apparatus 2000 changes the superimposition position or the content of the superimposed text.

The response in the SetOSD transaction 3057 does not include the OSDToken. The command in the CreateOSD transaction 3055 and the command in the SetOSD transaction 3057 are examples of the OSD setting command.

Reference numeral 3058 denotes a DeleteOSD transaction. The DeleteOSD transaction is a transaction to delete the image superimposition setting. The client apparatus 2000 transmits a DeleteOSD command to the monitoring camera 1000. The monitoring camera 1000, which has received the DeleteOSD command, returns a response to the command to the client apparatus 2000.

Through the DeleteOSD transaction, the client apparatus 2000 deletes the image superimposition setting acquired in the GetOSDs transaction 3053 or the GetOSD transaction 3056 or the image superimposition setting newly created in the CreateOSD transaction 3055 from the monitoring camera 1000. The monitoring camera 1000 deletes the image superimposition setting having the OSDToken, which is the ID of the specified image superimposition setting.

Figure 6:
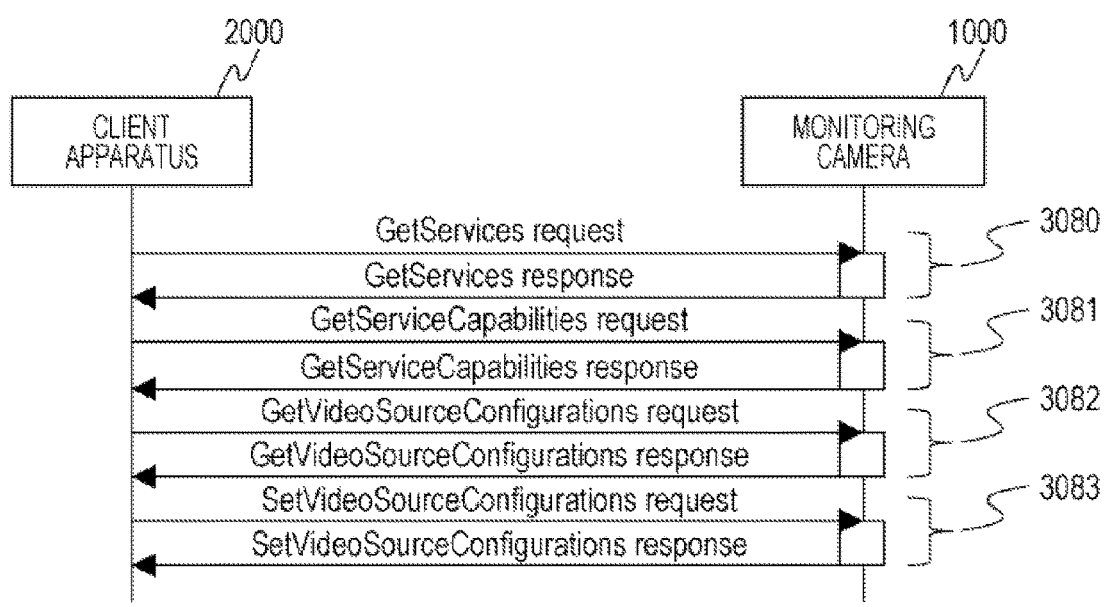
FIG. 6 is a sequence diagram for description of another command sequence between the monitoring camera and the client apparatus according to the embodiment.

FIG. 6 is a sequence diagram for description of a typical command sequence of the image processing setting between the monitoring camera 1000 and the client apparatus 2000.

Since transactions from 3080 to 3082 are the same as the transactions 3050 to 3052, a description of the transaction 3080 to 3082 is omitted herein.

Reference numeral 3083 denotes a SetVideoSourceConfigurations transaction. The client apparatus 2000 transmits a SetVideoSourceConfigurations command to the monitoring camera 1000. The monitoring camera 1000, which has received the SetVideoSourceConfigurations command, updates VideoSourceConfiguration Stored in the monitoring camera 1000 in response to the received command.

Through the SetVideoSourceConfigurations transaction, the client apparatus 2000 is capable of specifying the ID of the image processing setting to update the image processing setting corresponding to the specified ID in the list of the image processing settings acquired in the GetVideoSourceConfigurations transaction 3082. For example, the client apparatus 2000 is capable of updating the size of the captured image, the setting indicating whether the captured image is rotated, and the angle at which the captured image is rotated, which are included in the image processing setting corresponding to the specified ID.

FIG. 7A to FIG. 7I are diagrams for description of the structure of an OSDConfiguration type, which is a data type according to the present embodiment. Data types illustrated in FIG. 7A to FIG. 7I are used in the transaction to request acquisition of the list of the image superimposition settings, the transaction to request acquisition of the image superimposition setting, the transaction to change the image superimposition setting, and the transaction to delete the image superimposition setting according to the present embodiment.

The data types illustrated in FIG. 7A to FIG. 7I are defined using Extensible Markup Language (XML) Schema Definition language (hereinafter sometimes referred to as XSD).

FIG. 7A illustrates an exemplary definition of the OSDConfiguration type. As illustrated in FIG. 7A, the OSDConfiguration type is defined as a complex type with a complexType element of the XML.

In the OSDConfiguration type, a complexContent element and an extension element and its base attribute indicate that the OSDConfiguration type is of an extension type resulting from extension of a DeviceEntity type. A sequence element indicates that the OSDConfiguration type is subjected to data extension in which the elements appear in the defined order.

FIG. 7B illustrates an exemplary definition of an OSDReference type. In the OSDReference type, a simpleContnet element and the extension element and its base attribute indicate that the OSDReference type is of the extension type resulting from extension of a ReferenceToken type.

FIG. 7C illustrates an exemplary definition of an OSDType type. In the OSDType type, a simpleType element indicates that the OSDType type is of a simple type of the XML, and a restriction element and its base attribute indicate that the OSDType type is of a value restriction type of a string type. In the example in FIG. 7C, the OSDType type has a value of Text, Image, or Extended.

FIG. 7D illustrates an exemplary definition of an OSDPosConfiguration type. In the OSDPosConfiguration type, the complexType element indicates that the OSDPosConfiguration type is defined as the complex type. The sequence element indicates that the OSDPosConfiguration type is of the data type in which the elements appear in the defined order.

FIG. 7E illustrates an exemplary definition of an OSDTextConfiguration type. In the OSDTextConfiguration type, the complexType element indicates that the OSDTextConfiguration type is defined as the complex type. The sequence element indicates that the OSDTextConfiguration type is of the data type in which the elements appear in the defined order.

FIG. 7F illustrates an exemplary definition of an OSDImgConfiguration type. In the OSDImgConfiguration type, the complexType element indicates that the OSDImgConfiguration type is defined as the complex type. The sequence element indicates that the OSDImgConfiguration type is of the data type in which the elements appear in the defined order.

FIG. 7G illustrates an exemplary definition of an OSDConfigurationExtension type. In the OSDConfigurationExtension type, the complexType element indicates that the OSDConfigurationExtension type is defined as the complex type. The sequence element indicates that the OSDConfigurationExtension type is of the data type in which the elements appear in the defined order.

FIG. 7H illustrates an exemplary definition of an OSDColor type. In the OSDColor type, the complexType element indicates that the OSDColor type is defined as the complex type. The sequence element indicates that the OSDColor type is of the data type in which the elements appear in the defined order.

FIG. 7I illustrates an exemplary definition of a Color type. The Color type has a structure in which attributes X, Y, and Z of a float type can be described with an attribute element. It is indicated that the attributes X, Y, and Z are required components in the Color type with use="required" specification. The Color type has a structure in which an attribute Colorspace of an anyURI type can be described with the attribute element.

FIG. 8A to FIG. 8F are diagrams for description of exemplary definitions of the VideoSourceConfiguration type, which is a data type according to the present embodiment. Data types illustrated in FIG. 8A to FIG. 8F are used in the transaction to acquire the list of the image processing settings, the transaction to request addition of the image processing setting, and the transaction to change the image processing setting according to the present embodiment. The data types illustrated in FIG. 8A to FIG. 8F are defined using the XSD, as in FIG. 7A to FIG. 7I.

FIG. 8A illustrates an exemplary definition of the VideoSourceConfiguration type. In the VideoSourceConfiguration type, the complexType element indicates that the VideoSourceConfiguration type is defined as the complex type.

In the VideoSourceConfiguration type, the complexContent element an the extension element and its base attribute indicate that the VideoSourceConfiguration type is of the extension type resulting from extension of a ConfigurationEntity type. The sequence element indicates that the VideoSourceConfiguration type is of the data type in which the elements appear in the defined order.

FIG. 8B illustrates an exemplary definition of a ReferenceToken type. In the ReferenceToken type, the simpleType element indicates that the ReferenceToken type is of the simple type of the XML, and the restriction element and its base attribute indicate that the ReferenceToken type is of the value restriction type of the string type.

FIG. 8C illustrates an exemplary definition of an IntRectangle type. The IntRectangle type has a structure in which attributes x, y, width, and height of an int type can be described with the attribute element. It is indicated that the attributes x, y, width, and height are required components in the IntRectangle type with the use="required" specification.

FIG. 8D illustrates an exemplary definition of a VideoSourceConfigurationExtension type. In the VideoSourceConfigurationExtension type, the complexType element indicates that the VideoSourceConfigurationExtension type is defined as the complex type. The sequence element indicates that the VideoSourceConfigurationExtension type is of the data type in which the elements appear in the defined order.

FIG. 8E illustrates an exemplary definition of a Rotate type. In the Rotate type, the complexType element indicates that the Rotate type is defined as the complex type. The sequence element indicates that the Rotate type is of the data type in which the elements appear in the defined order.

FIG. 8F illustrates an exemplary definition of a RotateMode type. In the RotateMode type, the simpleType element indicates that the RotateMode type is of the simple type of the XML, and the restriction element and its base attribute indicate that the RotateMode type is of the value restriction type of the string type. In the exemplary definition in FIG. 8F, the RotateMode type has a value of OFF, ON, or AUTO.

FIG. 9A to FIG. 9E and FIG. 10A to FIG. 10F are diagrams for description of exemplary definitions of the MetadataStream type, which is a data type according to the present embodiment. Data types illustrated in FIG. 9A to FIG. 9E and FIG. 10A to FIG. 10F are used in object detection data concerning an object detected by the image processing unit 1003 and an event that is distributed to indicate that the object is detected by the image processing unit 1003. This event is distributed from the monitoring camera 1000 to the client apparatus 2000.

The data types illustrated in FIG. 9A to FIG. 9E and FIG. 10A to FIG. 10F are defined using the XSD, as in FIG. 7A to FIG. 7I.

FIG. 9A illustrates an exemplary definition of the MetadataStream type. In the MetadataStream type, the complexType element indicates that the MetadataStream type is defined as the complex type. The sequence element indicates that the MetadataStream type is of the data type in which the elements appear in the defined order.

A choice element in the sequence element indicates that one of the fields in the choice element is selected. Specifically, in the MetadataStream type, one of VideoAnalytics, PTZ, Event, and Extension fields described below is selected.

FIG. 9B illustrates an exemplary definition of a VideoAnalyticsStream type. In the VideoAnalyticsStream type, the complexType element indicates that the VideoAnalyticsStream type is defined as the complex type. Addition of the sequence element can indicate that the VideoAnalyticsStream type is of the data type in which the elements appear in the defined order.

FIG. 9C illustrates an exemplary definition of a PTZStream type. In the PTZStream type, the complexType element indicates that the PTZStream type is defined as the complex type. Addition of the sequence element can indicate that the PTZStream type is of the data type in which the elements appear in the defined order.

The choice element in the sequence element indicates that one of the fields in the choice element is selected. Specifically, in the PTZStream type, one of PTZStatus and Extension fields is selected.

FIG. 9D illustrates an exemplary definition of an EventStream type. In the EventStream type, the complexType element indicates that the EventStream type is defined as the complex type. Addition of the sequence element can indicate that the EventStream type is of the data type in which the elements appear in the defined order. The choice element in the sequence element indicates that one of the fields in the choice element is selected.

Specifically, in the EventStream type, one of NotificationMessage and Extension fields is selected.

FIG. 9E illustrates an exemplary definition of a MetadataStreamExtension type. In the MetadataStreamExtension type, the complexType element indicates that the MetadataStreamExtension type is defined as the complex type. The sequence element indicates that the MetadataStreamExtension type is of the data type in which the elements appear in the defined order.

FIG. 10A illustrates an exemplary definition of a Frame type. In the Frame type, the complexType element indicates that the Frame type is defined as the complex type. The sequence element indicates that the Frame type is of the data type in which the elements appear in the defined order.

FIG. 10B illustrates an exemplary definition of an Object type. In the Object type, the complexType element indicates that the Object type is defined as the complex type. The complexContent element and the extension element and its base attribute indicate that the Object type is the extension type resulting from extension of an ObjectId type.

In the Object type, the sequence element indicates that the Object type is subjected to the data extension in which the elements appear in the defined order.

FIG. 10C illustrates an exemplary definition of an Appearance type. In the Appearance type, the complexType element indicates that the Appearance type is defined as the complex type. The sequence element indicates that the Appearance type is of the data type in which the elements appear in the defined order.

FIG. 10D illustrates an exemplary definition of a ShapeDescriptor type. In the ShapeDescriptor type, the complexType element indicates that the ShapeDescriptor type is defined as the complex type. The sequence element indicates that the ShapeDescriptor type is of the data type in which the elements appear in the defined order.

FIG. 10E illustrates an exemplary definition of a Rectangle type. The Rectangle type has a structure in which attributes bottom, top, right, and left of the float type can be described with the attribute element. It is indicated that the attributes bottom, top, right, and left are required components in the Rectangle type with the use="required." specification.

FIG. 10F illustrates an exemplary definition of a Vector type. The Vector type has a structure in which attributes x and y of the float type can be described with the attribute element. It is indicated that the attributes x and y are required components in the Vector type with the use="required" specification.

Figure 11:
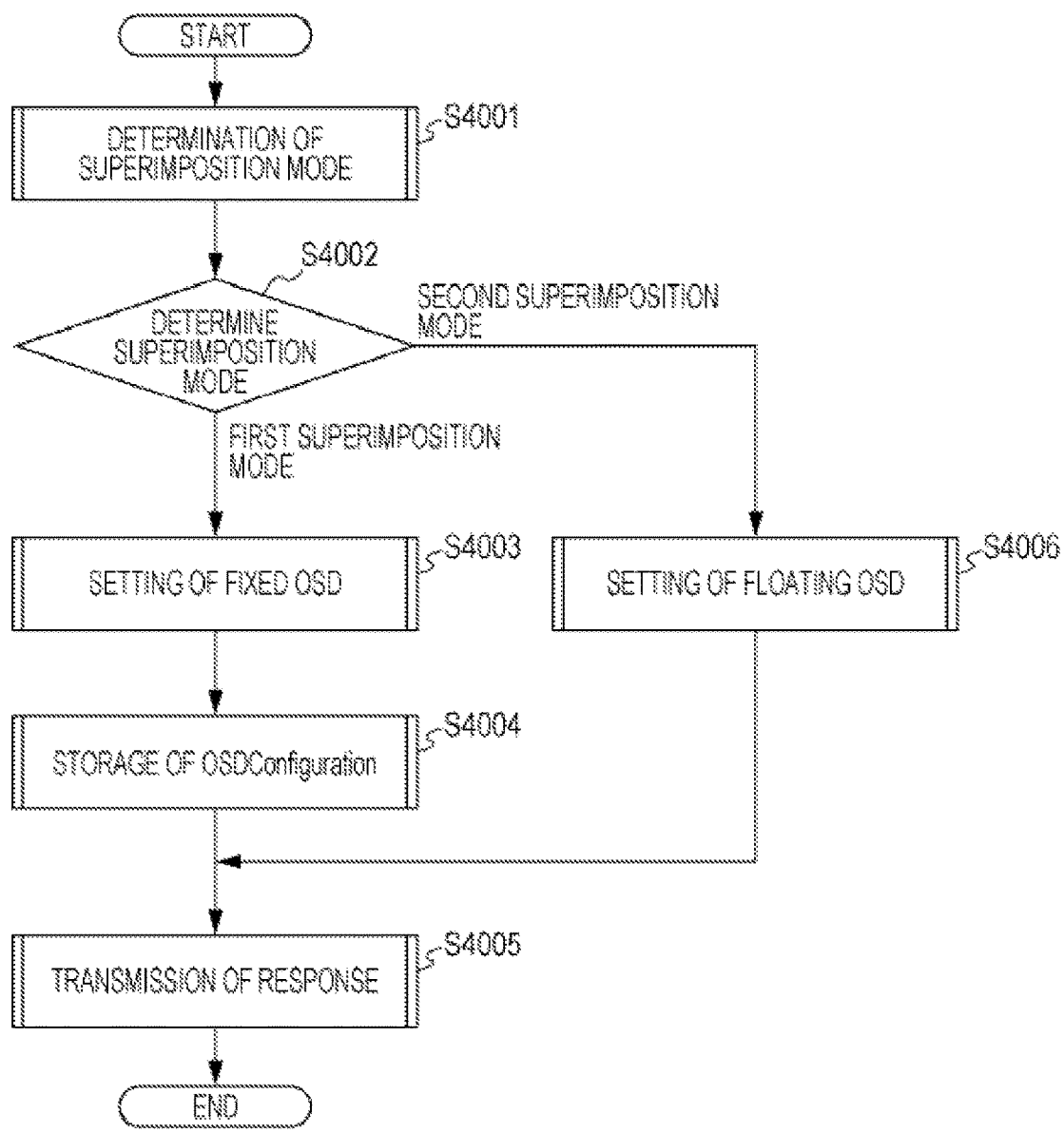
FIG. 11 is a flowchart for description of a SetVideoSourceConfiguration reception process according to the embodiment.

FIG. 11 is a flowchart for description of a SetVideoSourceConfiguration reception process. With the SetVideoSourceConfiguration reception process, the setting values of the VideoSourceConfiguration are reflected in the setting of the OSD image.

The SetVideoSourceConfiguration reception process is executed by the control unit 1008. The SetVideoSourceConfigurations command corresponds to the command to change the image processing setting (that is, the SetVideoSourceConfigurations command corresponds to a rotation instruction to rotate the captured image).

Upon reception of the SetVideoSourceConfigurations command from the client apparatus 2000, the control unit 1008 starts the SetVideoSourceConfiguration reception process in FIG. 11.

Specifically, upon reception of the SetVideoSourceConfigurations command from the client apparatus 2000, the control unit 1008 selects one piece of OSD setting information from the multiple pieces of OSD setting information stored in the storage unit 1009. After the selection, the control unit 1008 starts an OSD image drawing process described below. Specifically, the control unit 1008 starts the SetVideoSourceConfiguration reception process in FIG. 11 and, after the SetVideoSourceConfiguration reception process is terminated, instructs the OSD generation unit 1007 to start a process illustrated in FIG. 15 described below.

After the OSD image drawing process is terminated, the control unit 1008 newly selects one piece of OSD setting information from the multiple pieces of OSD setting information stored in the storage unit 1009. After the selection, the control unit 1008 starts the OSD image drawing process described above. The control unit 1008 repeats the series of processing until all the multiple pieces of OSD setting information stored in the storage unit 1009 are selected.

Referring to FIG. 11, in Step S4001, the control unit 1008 executes a superimposition mode determination process. The superimposition mode determination process is a process to determine whether the OSD setting information (OSDConfiguration) selected by the control unit 1008 indicates a first superimposition mode or a second superimposition mode.

In the first superimposition mode, when the distributed image distributed from the monitoring camera 1000 is rotated, the position of the OSD image on a display screen of the distributed image is not varied. In other words, in the first superimposition mode, the position of the OSD image in a normalized coordinate system described below is not varied. The horizontal direction and the vertical direction in the normalized coordinate system are constant regardless of whether the distributed image is rotated.

In addition, in other words, in the first superimposition mode, when the distributed image distributed from the monitoring camera 1000 is rotated, the position of the OSD image is varied with respect to the subject included in the distributed image (that is, in the first superimposition mode, the superimposition position of the OSD image in the distributed image is not varied in accordance with the variation of the subject included in the distributed image).

Furthermore, in other words, in the first superimposition mode, the position of the OSD image in the entire range in which the monitoring camera 1000 is capable of capturing an image is varied. The OSD image superimposed in the first superimposition mode corresponds to a fixed OSD image 5006 described below.

In the second superimposition mode, when the distributed image distributed from the monitoring camera 1000 is rotated, the position of the OSD image on the display screen of the distributed image is varied. In other words, in the second superimposition mode, the position of the OSD image in the normalized coordinate system described below is varied.

In addition, in other words, in the second superimposition mode, when the distributed image distributed from the monitoring camera 1000 is rotated, the position of the OSD image is not varied with respect to the subject included in the distributed image (that is, in the second superimposition mode, the superimposition position of the OSD image in the distributed image is varied in accordance with the variation of the subject included in the distributed image).

Furthermore, in other words, in the second superimposition mode, the position of the OSD image in the entire range in which the monitoring camera 1000 is capable of capturing an image is not varied. The OSD image superimposed in the second superimposition mode corresponds to a floating OSD image 5005 described below.

In Step S4002, the control unit 1008 determines whether the OSDConfiguration indicates the first superimposition mode or the second superimposition mode. If the control unit 1008 determines that the OSDConfiguration indicates the first superimposition mode, the process goes to Step S4003. If the control unit 1008 determines that the OSDConfiguration indicates the second superimposition mode, the process goes to Step S4006.

In Step S4003, the control unit 1008 executes a fixed OSD setting process described below. After the fixed OSD setting process, the process goes to Step S4004.

In Step S4004, the control unit 1008 stores the OSDConfiguration selected by the control unit 1008 in the storage unit 1009 with the OSDToken.

In Step S4005, the control unit 1008 executes a response transmission process. The response transmission process is a process to transmit a response to the SetVideoSourceConfigurations command to the client apparatus 2000.

In Step S4006, the control unit 1008 executes a floating OSD setting process described below. After the floating OSD setting process, the process goes to Step S4005.

Figure 12:
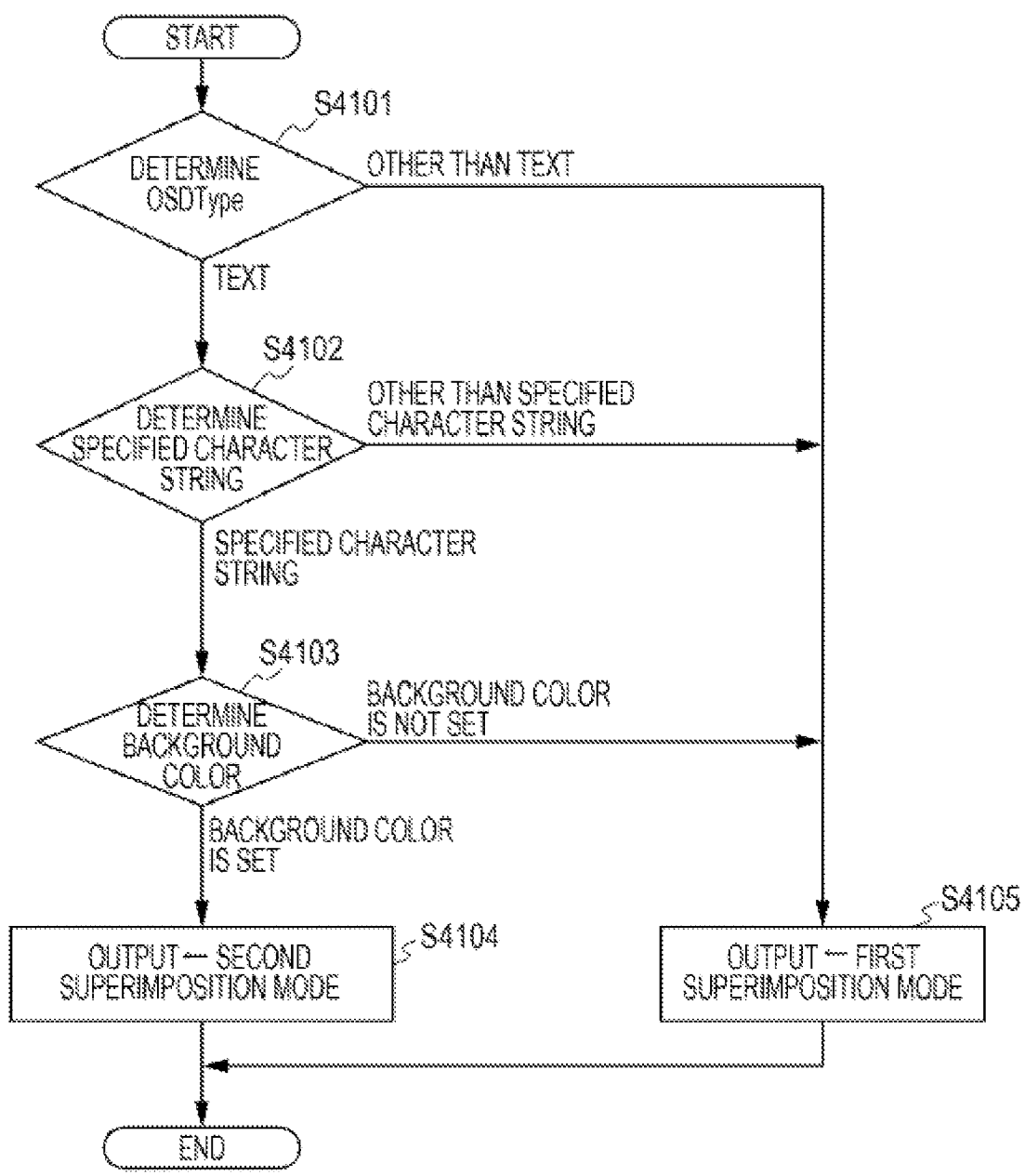
FIG. 12 is a flowchart for describing a superimposition mode determination process according to the embodiment.

FIG. 12 is a flowchart for describing the superimposition mode determination process in Step S4001 in FIG. 11 in detail. The superimposition mode determination process is executed by the control unit 1008.

Referring to FIG. 12, in Step S4101, the control unit 1008 determines whether a parameter indicating that the character information is superimposed as the OSD image (the superimposition information) is included in the parameters to set the OSD setting information selected by the control unit 1008. Specifically, the control unit 1008 determines whether the value of the OSDType included in the OSDConfiguration selected by the control unit 1008 is TEXT.

If the control unit 1008 determines that the value of the OSDType is TEXT, the control unit 1008 determines that the parameter indicating that the character information is superimposed as the OSD image is included in the parameters to set the OSD setting information selected by the control unit 1008.

If the control unit 1008 determines that the value of the OSDType is not TEXT, the control unit 1008 determines that the parameter indicating that the character information is superimposed as the OSD image is not included in the parameters to set the OSD setting information selected by the control unit 1008.

If the control unit 1008 determines that the parameter indicating that the character information is superimposed as the OSD image is included in the parameters to set the OSD setting information selected by the control unit 1008, the process goes to Step S4102.

If the control unit 1008 determines that the parameter indicating that the character information is superimposed as the OSD image is not included in the parameters to set the OSD setting information selected by the control unit 1008, the process goes to Step S4105.

In Step S4102, the control unit 1008 determines: whether the character string specified as the OSD image (the superimposition information) is a certain specified character string. This character string functions as a parameter to specify the type of the character information to be superimposed as the OSD image.

If the control unit 1008 determines that the OSD image is the specified character string, the process goes to Step S4103. If the control unit 1008 determines that the OSD image is not the specified character string, the process goes to Step S4105.

Although the case in which the OSD image is the specified character string corresponds to a case in which the value of PlainText included in the OSDTextConfiguration in the OSDConfiguration is blank in the present embodiment, the present embodiment is not limited to this case.

For example, the case in which the OSD image is the specified character string may correspond to a case in which the OSDTextConfiguration meets the following other conditions. Specifically, the case in which the OSD image is the specified character string may correspond to a case in which OSDType=TEXT, OSDTextConfiguration.Type=PLAIN, and the value of the PlainText is blank.

Alternatively, the case in which the OSD image is the specified character string may correspond to a case in which a control code, for example, "#FLOATING", indicating that the superimposition mode is the first superimposition mode is specified in the PlainText.

In Step S4103, the control unit 1008 determines whether a background color in the OSD image is set. Specifically, the control unit 1008 determines whether BackgroundColor is included in the OSDTextConfiguration in the OSDConfiguration.

If the control unit 1008 determines that the BackgroundColor is included in the OSDTextConfiguration in the OSDConfiguration, the control unit 1008 determines that the background color in the OSD image is set.

If the control unit 1008 determines that the BackgroundColor is not included in the OSDTextConfiguration in the OSDConfiguration, the control unit 1008 determines that the background color in the OSD image is not set.

If the control unit 1008 determines that the background color in the OSD image is set, the process goes to Step S4104. If the control unit 1008 determines that the background color in the OSD image is not set, the process goes to Step S4105.

In Step S4104, the control unit 1008 determines that the OSDConfiguration selected by the control unit 1008 indicates the second superimposition mode and outputs the fact that the OSDConfiguration indicates the second superimposition mode.

In Step S4105, the control unit 1008 determines that the OSDConfiguration selected by the control unit 1008 indicates the first superimposition mode and outputs the fact that the OSDConfiguration indicates the first superimposition mode.

Figure 13:
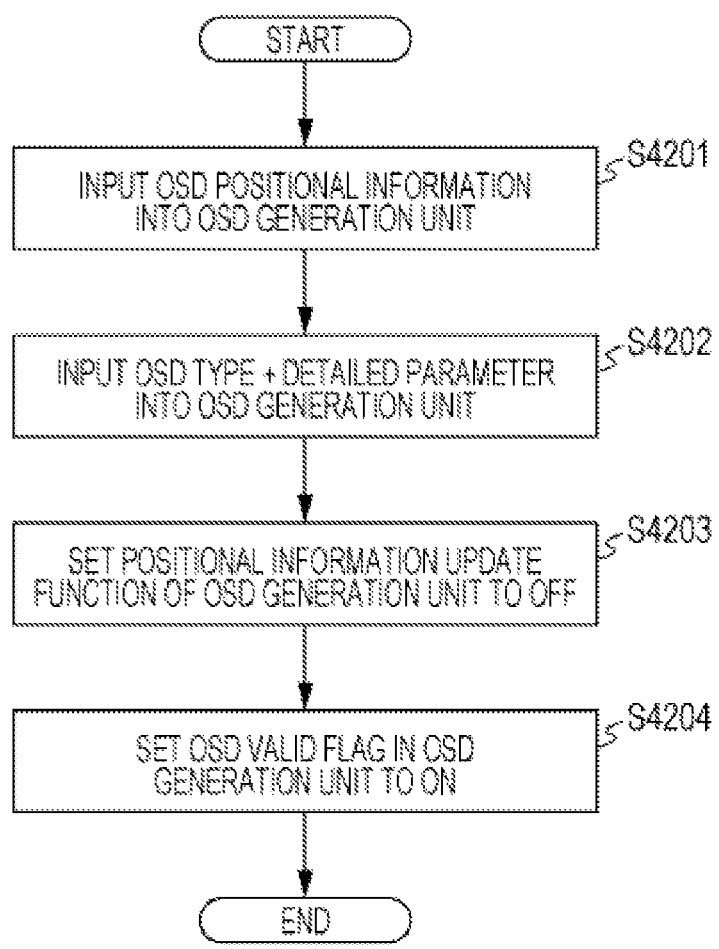
FIG. 13 is a flowchart for describing a fixed OSD setting process according to the embodiment.

FIG. 13 is a flowchart for describing the fixed OSD setting process in Step S4003 in FIG. 11 in detail. The fixed OSD setting process is executed by the control unit 1008.

Referring to FIG. 13, in Step S4201, the control unit 1008 inputs positional information about the OSD image included in the OSDConfiguration selected by the control unit 1008 (that is, the content of the setting of the OSDPosConfiguration) into the OSD generation unit 1007.

In Step S4202, the control unit 1008 inputs the content of the OSDTextConfiguration or the OSDImgConfiguration into the OSD generation unit 1007 in accordance with an OSD type described below. The OSD type is included in the OSDConfiguration determined in Step S4001. In detail, the OSD type is the content of the OSDType.

In Step S4203, the control unit 1008 sets a positional information update function of the OSD generation unit 1007 to OFF. Specifically, the control unit 1008 sets the superimposition mode in the OSD generation unit 1007 to a mode in which the superimposition position and the superimposition size of the OSD image are fixed with respect to a distributed image 5002.

In Step S4204, the control unit 1008 sets an OSD valid flag in the OSD generation unit 1007 to ON. This starts the superimposition process of the OSD image on the distributed image 5002.

Figure 14:
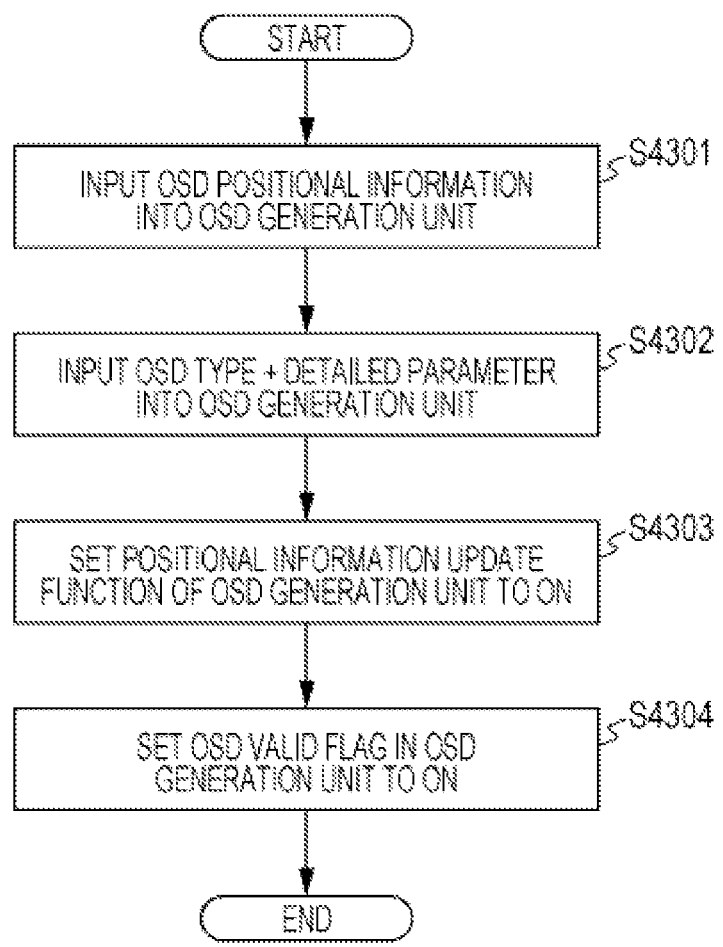
FIG. 14 is a flowchart for describing a floating OSD setting process according to the embodiment.

FIG. 14 is a flowchart for describing the floating OSD setting process in Step S4006 in FIG. 11 in detail. The floating OSD setting process is executed by the control unit 1008.

Steps S4301 and S4302 are the same as Steps S4201 and S4202 in FIG. 13, a description of Steps S4301 and S4302 is omitted herein.

In Step S4303, the control unit 1008 sets the positional information update function of the OSD generation unit 1007 to ON.

Specifically, the control unit 1008 sets the superimposition mode in the OSD generation unit 1007 to a mode in which the superimposition position and the superimposition size of the OSD image are fixed with respect to the entire range in which the monitoring camera 1000 is capable of capturing an image. In this mode, the superimposition position and the superimposition size of the superimposition information is not necessarily fixed with respect to the distributed image 5002.

Step S4304 is the same as Step S4204 in FIG. 13, a description of Step S4304 is omitted herein.

Figure 15:
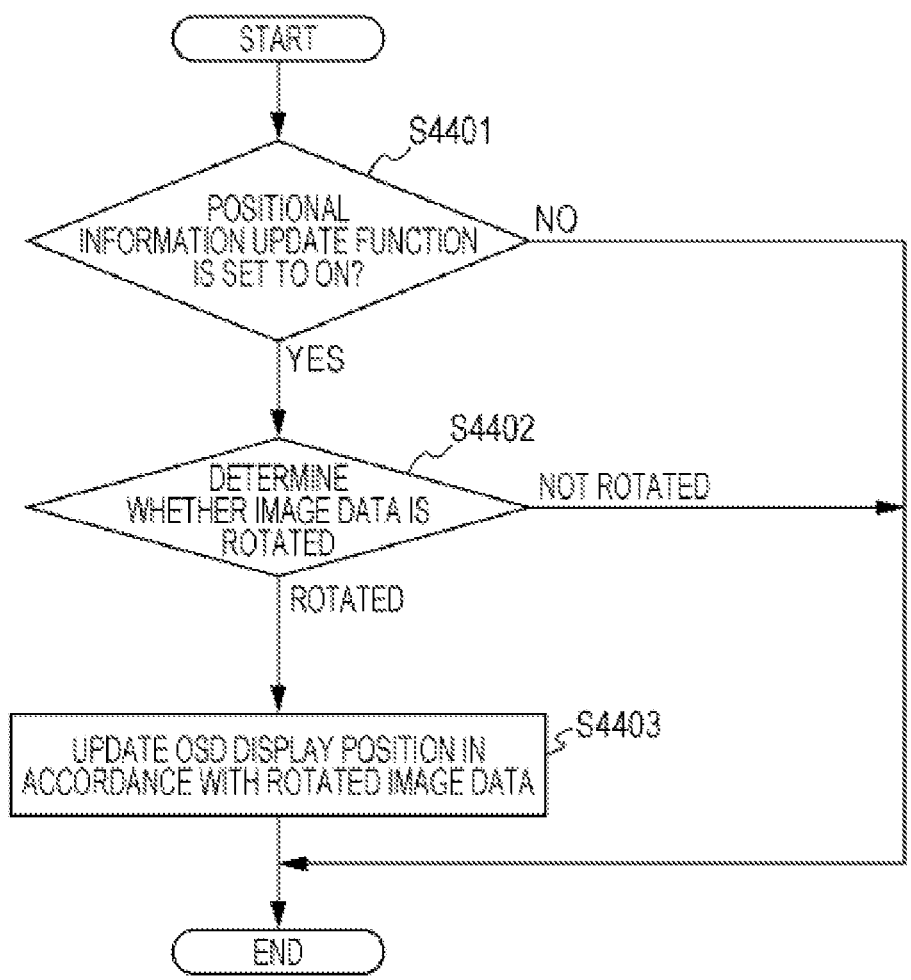
FIG. 15 is a flowchart for description of an OSD positional information updating process according to the embodiment.

FIG. 15 is a flowchart for description of an OSD positional information updating process. The OSD positional information updating process is described as a process to be executed by a processor that is independent of the control unit 1008 and that is included in the OSD generation unit 1007. In a mode in which the OSD generation unit 1007 includes the processor, the flowchart of the OSD positional information updating process in FIG. 15 indicates a program causing the processor in the OSD generation unit 1007 to execute the process illustrated in FIG. 15.

The processor included in the OSD generation unit 1007 is a computer that executes the program read out from the storage unit 1009 in the monitoring camera 1000.

Alternatively, the control unit 1008 may execute the OSD positional information updating process. In a mode in which the control unit 1008 in the monitoring camera 1000 includes the processor, the flowchart of the OSD positional information updating process in FIG. 15 indicates a program causing the control unit 1008 to execute the process illustrated in FIG. 15. The processor included control unit 1008 in the monitoring camera 1000 is a computer that executes the program read out from the storage unit 1009 in the monitoring camera 1000.

Referring to FIG. 15, in Step S4401, the OSD generation unit 1007 determines whether the positional information update function is set to ON. If the OSD generation unit 1007 determines that the positional information update function is set to ON, the process goes to Step S4402. If the OSD generation unit 1007 determines that the positional information update function is not set to ON, the process in FIG. 15 is terminated.

In Step S4402, the OSD generation unit 1007 determines whether the image processing unit 1003 rotates the captured image supplied from the image capturing unit 1002. The OSD generation unit 1007 performs the determination on the basis of the setting to rotate the captured image included in the SetVideoSourceConifigurations command received from the client apparatus 2000 and the angle at which the captured image is rotated.

Figure 17:
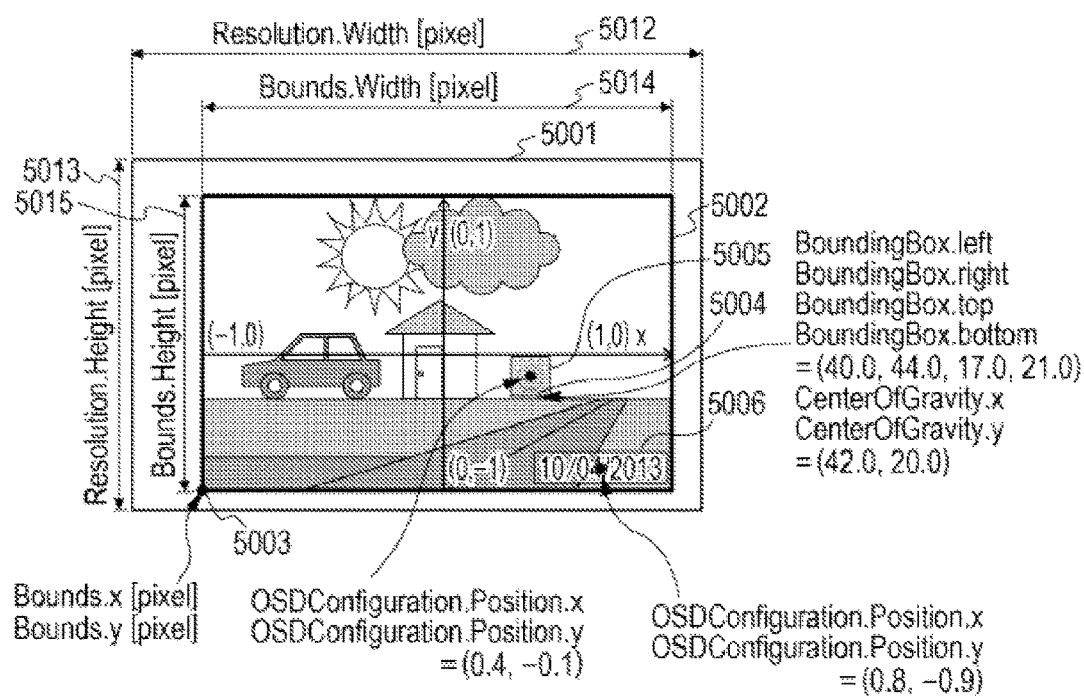
FIG. 17 illustrates an example of a distributed image subjected to streaming distribution from the monitoring camera according to the embodiment.

If the OSD generation unit 1007 determines that the image processing unit 1003 rotates the captured image supplied from the image capturing unit 1002, the process goes to Step S4403. For example, when the distributed image 5002 illustrated in FIG. 17 is varied to the distributed image 5002 illustrated in FIG. 18, the OSD generation unit 1007 determines that the image processing unit 1003 rotates the captured image supplied from the image capturing unit 1002. The process goes to Step S4403. Although the image size (an aspect ratio) is also varied from the captured image in FIG. 17 to the captured image in FIG. 18, the image size may not be varied.

If the OSD generation unit 1007 determines that the image processing unit 1003 does not rotate the captured image supplied from the image capturing unit 1002, the OSD positional information updating process in FIG. 15 is terminated.

In Step S4403, the OSD generation unit 1007 updates the superimposition position and the superimposition size of the OSD image for which the positional information update function is set to ON in Step S4303 on the basis of the angle at which the image processing unit 1003 rotates the captured image supplied from the image capturing unit 1002.

Specifically, the OSD generation unit 1007 recalculates the superimposition position and the superimposition size on the basis of the angle so that the superimposition position and the superimposition size of the OSD image are not varied in the entire range in which the monitoring camera 1000 is capable of capturing an image. The OSD generation unit 1007 outputs the OSD image so as to be superimposed at the recalculated superimposition position and in the recalculated superimposition size.

An example of the captured image to be subjected to the streaming delivery from the monitoring camera 1000 will now be described with reference to FIG. 16 to FIG. 18. More specifically, FIG. 16 to FIG. 18 each indicate the relationship between the superimposition position of the OSD image and the coordinate in the monitoring camera 1000.

Figure 16:
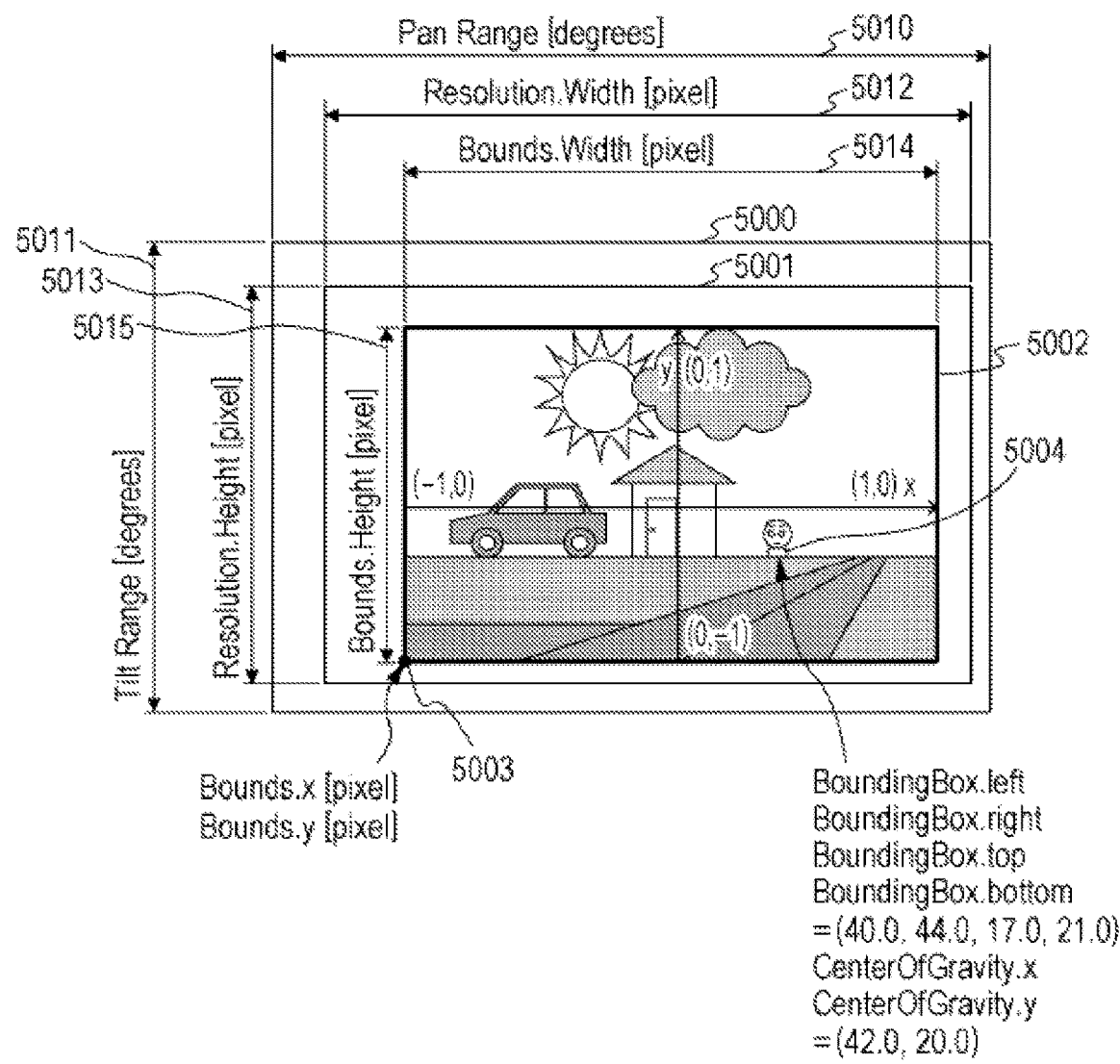
FIG. 16 is a diagram for description of the relationship between an image capturing range of the monitoring camera and an OSD superimposition position according to the embodiment.

Referring to FIG. 16, a pan range 5010 indicates the entire range of motion of the arm mechanism 1102 in the pan direction. A tilt range 5011 indicates the entire range of motion of the arm mechanism 1102 in the tilt direction. An image capturing range 5000 indicates the entire range in which the image capturing unit 1002 is capable of capturing an image in response to the arm mechanism 1102 that is driven.

A captured image 5001 indicates the captured image supplied from the image capturing unit 1002 at a magnification. Reference numeral 5012 denotes a horizontal range of the captured image 5001. Reference numeral 5013 denotes a vertical range of the captured image 5001. The distributed image 5002 is the distributed image specified by Bounds included in the VideoSourceConfiguration.

The Bounds includes a horizontal direction position (x) and a vertical direction position (y) used to specify a lower left vertex 5003 of the distributed image 5002 with pixels as a cut-out position where the distributed image 5002 is cut out from the captured image 5001. The lower left vertex 5003 corresponds to the origin of the coordinate indicated by the Bounds.

The Bounds includes a horizontal direction size (Width) 5014 and a vertical direction size (Height) 5015 used to specify the size of the distributed image 5002 with pixels.

A subject 5004 is the subject in the distributed image 5002. In the present embodiment, the position of the subject 5004 is indicated with a block coordinate system using an upper left vertex of the distributed image 5002 cut out with the Bounds as the origin. The block coordinate system is horizontally (x) divided into 60 and vertically (y) divided into 32.

The position of the subject 5004 indicated with the block coordinate system is indicated from the monitoring camera 1000 to the client apparatus 2000 with the ShapeDescriptor type (FIG. 10D) data included in the Metal=Stream type (FIG. 9A) data.

More specifically, the position of the subject 5004 indicated with the block coordinate system is indicated to the client apparatus 2000 with BoundingBox and CenterOfGravity included in the ShapeDescriptor type data.

In the example in FIG. 16, the range of the subject 5004 is specified as BoundingBox (left, right, top, bottom)=(40.0, 44.0, 17.0, 21.0) in the distributed image 5002. The position of the subject 5004 is specified as CenterOfGravity(x,y)= (42.0, 20.0) in the distributed image 5002.

Referring to FIG. 17, reference numeral 5005 denotes an OSD image specified by the OSDConfiguration type data in FIG. 7A. This OSD image corresponds to the floating OSD image described above. Reference numeral 5006 denotes an OSD image specified by the OSDConfiguration type data in FIG. 7A. This OSD image corresponds to the fixed OSD image described above.

In the present embodiment, the characters included in the fixed OSD image 5006 represent the date when the image capturing unit 1002 captures an image of the subject. In the present embodiment, the floating OSD image 5005 corresponds to a privacy mask image with which a certain area in the captured image supplied from the image capturing unit 1002 is covered.

In the present embodiment, the positions of the floating OSD image 5005 and the fixed OSD image 5006 are specified with the OSDPosConfiguration type data in FIG. 7D.

More specifically, in the OSDPosConfiguration type data, the center points of the floating OSD image 5005 and the fixed OSD image 5006 are specified with the normalized coordinate system in which the distributed image 5002 cut out with the Bounds is normalized within a range from −1.0 to +1.0 in the horizontal direction (x) and the vertical direction (y). The storage unit 1009 in the present embodiment functions as a storing unit that stores information indicating the normalized coordinate system.

In the example in FIG. 17, the center point of the floating OSD image 5005 is specified as (x,y)=(0.4, −0.1) in the distributed image 5002. This center point corresponds to the position at which the floating OSD image 5005 is superimposed on the distributed image 5002.

In the example in FIG. 17, the center point of the fixed OSD image 5006 is specified as (x,y)=(0.8, −0.9) in the distributed image 5002. This center point corresponds to the position at which the fixed OSD image 5006 is superimposed on the distributed image 5002.

Figure 18:
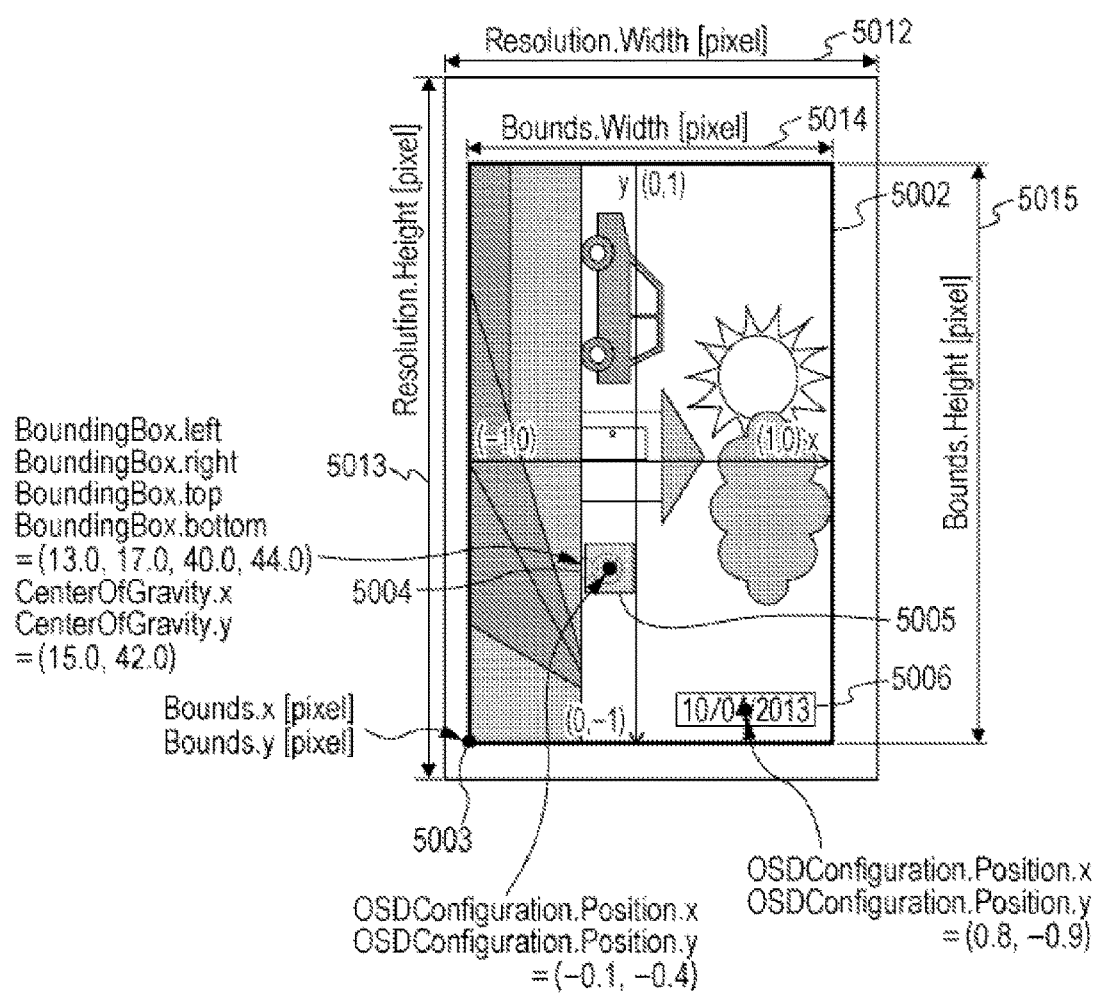
FIG. 18 illustrates another example of the distributed image subjected to the streaming distribution from the monitoring camera according to the embodiment.

FIG. 18 is an exemplary diagram for description of the distributed image 5002 when the distributed image 5002 illustrated in FIG. 17 is rotated clockwise by 90 degrees. More specifically, FIG. 18 is a diagram for description of the positions of the subject 5004, the floating OSD image 5005, and the fixed OSD image 5006 when the distributed image 5002 illustrated in FIG. 17 is rotated clockwise by 90 degrees.

The rotation by 90 degrees is performed by the client apparatus 2000 that uses (transmits) the VideoSourceConfigurations command.

Referring to FIG. 18, the range and the position of the subject 5004 in the distributed image 5002 are recalculated because the distributed image 5002 is rotated clockwise by 90 degrees. In the example in FIG. 18, the range of the subject 5004 is specified as BoundingBox (left, right, top, bottom)=(13.0, 17.0, 40.0, 44.0) in the distributed image 5002.

In the example in FIG. 18, the position of the subject 5004 is specified as CenterOfGravity (x,y)=(15.0, 42.0) in the distributed image 5002.

The position of the floating OSD image 5005, which is specified by the OSDPosConfiguration type data in FIG. 7D, is not kept at the same position as that in FIG. 17. This is because the position is moved due to the clockwise rotation of the distributed image 5002 by 90 degrees.

In the example in FIG. 18, the position of the floating OSD image 5005, which is specified by the OSDPosConfiguration type data in FIG. 7D, is specified as (x,y)=(−0.1, −0.4) in the distributed image 5002.

In contrast, the position of the fixed OSD image 5006, which is specified by the OSDPosConfiguration type data in FIG. 7D, is kept at the same position as that in FIG. 17. This is because the position is not moved even when the distributed image 5002 is rotated clockwise by 90 degrees.

FIG. 19A and FIG. 19B illustrate exemplary structures of the MetadataStream including, for example, object information concerning an object detected in the distributed image 5002. The MetadataStream is transmitted from the monitoring camera 1000 to the client apparatus 2000.

The MetadataStream in FIG. 19A corresponds to the distributed image 5002 in FIG. 17. In the MetadataStream in FIG. 19A, the range of the subject 5004 is specified by the BoundingBox. Specifically, the range is specified as BoundingBox(left, right, (op, bottom)=(40.0, 44.0, 17.0, 21.0).

In the MetadataStream in FIG. 19A, the position of the subject 5004 is specified by the CenterOfGravity. Specifically, the position is specified as CenterOfGravity(x,y)= (42.0, 20.0).

The MetadataStream in FIG. 19B corresponds to the distributed image 5002 in FIG. 18. In the MetadataStream in FIG. 19B, the range of the subject 5004 is specified as BoundingBox(left, right, top, bottom)=(13.0, 17.0, 40.0, 44.0).

In the MetadataStream in FIG. 19B, the position of the subject 5004 is specified as CenterOfGravity(x,y)=(15.0, 42.0).

FIG. 20A to FIG. 20C illustrate exemplary structures of the GetOSDs response used to transmit the OSD setting information corresponding to the OSD image included in the distributed image 5002 to the client apparatus 2000. The GetOSDs response is the OSDConfiguration type data in FIG. 7A.

FIG. 20A illustrates an exemplary structure of the GetOSDs response corresponding to the fixed OSD image 5006 in FIG. 17 and FIG. 18. In the GetOSDs response in FIG. 20A, the superimposition position of the fixed OSD image 5006 is specified as (x,y)=(0.8, −0.9) in a Pos field.

FIG. 20B illustrates an exemplary structure of the GetOSDs response corresponding to the floating OSD image 5005 in FIG. 17. In the GetOSDs response in FIG. 20B, the superimposition position of the floating OSD image 5005 is specified as (x,y)=(0.4, −0.1) in the Pos field.

FIG. 20C illustrates an exemplary structure of the GetOSDs response corresponding to the floating OSD image 5005 in FIG. 18. In the GetOSDs response in FIG. 20C, the superimposition position of the floating OSD image 5005 is specified as (x,y)=(−0.1, −0.4) in the Pos field.

As described above, upon rotation of the distributed image 5002, the OSD generation unit 1007 varies the superimposition position of the OSD image on the basis of the OSDConfiguration type data. Specifically, the OSD generation unit 1007 varies only the position of the floating OSD image 5005, which is specified by the OSDPosConfiguration type data in FIG. 7D, on the basis of the OSDConfiguration type data and does not vary the position of ale fixed OSD image 5006.

In the variation of the position, the pieces of data used by the OSD generation unit 1007 are the OSDType included in the OSDConfiguration type data and the PlainText and the BackgroundColor included in the OSDTextConfiguration type data.

When the distributed image 5002 distributed from the monitoring camera 1000 is rotated, only a specific OSD image, among the multiple OSD images superimposed on the distributed image 5002, can be rotated in the above manner. As a result, it is possible to prevent the legibility of the OSD image from being degraded due to, for example, the rotation of the OSD image including characters on the display screen on which the distributed image 5002 is displayed.

When the distributed image 5002 is rotated, the control unit 1008 in the present embodiment is capable of rotating the position of an object in the coordinate system used to represent the position of the object detected from the distributed image 5002 without rotating the coordinate system. Accordingly, it is possible to prevent the mismatch in the positional relationship between the subject included in the distributed image 5002 and the detected object from occurring.

The present invention may be realized by executing the following processing. Specifically, software (a program) realizing the functions of the above embodiments may be supplied to a system or an apparatus via a network or various storage media and the computer (or the CPU or a microprocessor unit (MPU)) in the system or the apparatus may read out the program for execution.

While the embodiments of the invention have been described above, it will be recognized and understood that various changes and modifications can be made in the invention within the spirit and scope of the invention.

According to the present invention, it is possible to rotate an appropriate piece of information, among pieces of information concerning a captured image, in accordance with rotation of the captured image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-217291, filed Oct. 18, 2013, which is hereby incorporated by reference herein in its entirety.

The invention claimed is:

1. An image pickup apparatus capable of communicating with an external apparatus, the image pickup apparatus comprising:
   an image capturing device which captures an image to generate a captured image; and
   a circuitry to:
   receive, via a network, a command to output an image obtained by performing rotating processing on the captured image, and
   superimpose, in a case where the command has been received and in accordance with a flag set for superimposing information, the superimposing information on the output image obtained by performing rotating processing on the captured image output from the image capturing device,
   wherein, in accordance with the flag set for the superimposing information, it is determined whether to superimpose the superimposing information on the output image as first superimposing information or second superimposing information,
   wherein the first superimposing information is superimposed on a predetermined position in the output image when the output image is displayed on a display screen, and
   wherein the second superimposing information is superimposed on the output image to follow the position of the rotating processing.

2. The image pickup apparatus according to claim 1, wherein the first superimposing information includes character information.

3. The image pickup apparatus according to claim 2, wherein the character information includes a date when the image capturing device captures the image of the subject.

4. The image pickup apparatus according to claim 1, wherein the second superimposing information includes a privacy mask image with which a certain area in the captured image supplied from the image capturing device is masked.

5. The image pickup apparatus according to claim 4, wherein the circuitry further is to:
   detect a subject from the captured image supplied from the image capturing device,
   store a coordinate representing a position of the detected subject, and
   determine a position of the second superimposing information, in accordance with the position of the detected subject,
   wherein, when the captured image supplied from the image capturing device is rotated, the determined position of the second superimposing information is updated.

6. The image pickup apparatus according to claim 5, wherein the circuitry receives the command including a rotation instruction to rotate the captured image from the external apparatus, and receives designation information to designate the position of the first superimposing information and the second superimposing information onto the output image.

7. The image pickup apparatus according to claim 5, wherein the coordinate representing the position of the detected subject further includes a range of the detected subject.

8. The image pickup apparatus according to claim 5, wherein, when the captured image supplied from the image capturing device is rotated, a determined range of the second superimposing information is updated.

9. An image capturing system comprising:
   an external apparatus having a transmitter interface configured to transmit, to an image pickup apparatus, a rotation instruction to rotate a captured image supplied from an image capturing device; and
   an image pickup apparatus capable of communicating with the external apparatus,
   wherein the image pickup apparatus includes:
   the image capturing device which captures an image to generate the captured image, and
   a circuitry to:
   receive, via a network, a command to output an image obtained by performing rotating processing on the captured image, and
   superimpose, in a case where the command has been received and in accordance with a flag set for superimposing information, the superimposing information on the output image obtained by performing rotating processing on the captured image output from the image capturing device, wherein, in accordance with the flag set for the superimposing information, it is determined whether to superimpose the superimposing information on the output image as first superimposing information or second superimposing information, wherein the first superimposing information is superimposed on a predetermined position in the output image when the output image is displayed on a display screen, and wherein the second superimposing information is superimposed on the output image to follow the rotating processing.

10. A method of controlling an image pickup apparatus capable of communicating with an external apparatus, wherein the image pickup apparatus includes an image capturing device which captures an image to generate a captured image, the method comprising:

receiving, via a network, a command to output an image obtained by performing rotating processing on the captured image; and superimposing, in a case where the command has been received and in accordance with a flag set for superimposing information, the superimposing information on the output image obtained by performing rotating processing on the captured image output from the image capturing device, wherein, in accordance with the flag set for the superimposing information, it is determined whether to superimpose the superimposing information on the output image as first superimposing information or second superimposing information, wherein the first superimposing information is superimposed on a predetermined position in the output image when the output image is displayed on a display screen, and wherein the second superimposing information is superimposed on the output image to follow the rotating processing.

11. A non-transitory computer-readable storage medium storing a computer-executable program to cause a computer to perform a method of controlling an image pickup apparatus capable of communicating with an external apparatus, wherein the image pickup apparatus includes an image capturing device which captures an image to generate a captured image, the method comprising:

receiving, via a network, a command to output an image obtained by performing rotating processing on the captured image; and superimposing, in a case where the command has been received and in accordance with a flag set for superimposing information, the superimposing information on the output image obtained by performing rotating processing on the captured image output from the image capturing device, wherein, in accordance with the flag set for the superimposing information, it is determined whether to superimpose the superimposing information on the output image as first superimposing information or second superimposing information, wherein the first superimposing information is superimposed on a predetermined position in the output image when the output image is displayed on a display screen, and wherein the second superimposing information is superimposed on the output image to follow the rotating processing.

* * * * *